United States Patent

Bamberger et al.

Patent Number: 5,854,851
Date of Patent: Dec. 29, 1998

[54] SYSTEM AND METHOD FOR DIAGNOSIS OF LIVING TISSUE DISEASES USING DIGITAL IMAGE PROCESSING

[75] Inventors: Philippe Bamberger; Isaac Leichter; Scott Fields, all of Jerusalem, Israel

[73] Assignee: Sophis View Technologies Ltd., Jerusalem, Israel

[21] Appl. No.: 289,381

[22] Filed: Aug. 11, 1994

[30] Foreign Application Priority Data

Aug. 13, 1993 [IL] Israel ............................. 106691

[51] Int. Cl.⁶ ............................................. G06K 9/00
[52] U.S. Cl. ................................. 382/132; 382/274
[58] Field of Search .................................. 382/128, 132, 382/169, 254, 270, 274; 378/62; 364/413.13, 413.26; 128/653.1

[56] References Cited

U.S. PATENT DOCUMENTS

| | | | |
|---|---|---|---|
| 4,302,672 | 11/1981 | Kato et al. | 250/327.1 |
| 4,403,337 | 9/1983 | Kleinman | 378/95 |
| 4,597,094 | 6/1986 | Kleinman | 378/95 |
| 4,641,267 | 2/1987 | Asai et al. | 364/414 |
| 4,819,258 | 4/1989 | Kleinman et al. | 378/111 |
| 4,868,651 | 9/1989 | Chou et al. | 358/111 |
| 4,887,305 | 12/1989 | Shimura | 382/51 |
| 4,907,156 | 3/1990 | Doi et al. | 364/413.13 |
| 4,937,682 | 6/1990 | Dalton | 358/461 |
| 5,003,979 | 4/1991 | Merickel et al. | 128/653 A |
| 5,042,077 | 8/1991 | Burke | 382/51 |
| 5,046,118 | 9/1991 | Ajewole et al. | 382/51 |
| 5,048,110 | 9/1991 | Nakajima | 382/54 |
| 5,072,384 | 12/1991 | Doi et al. | 364/413.13 |
| 5,079,698 | 1/1992 | Grenier et al. | 364/413.13 |
| 5,133,020 | 7/1992 | Giger et al. | 382/6 |
| 5,134,668 | 7/1992 | Appel | 382/50 |
| 5,150,421 | 9/1992 | Morishita et al. | 382/6 |
| 5,164,993 | 11/1992 | Capozzi et al. | 382/6 |
| 5,212,637 | 5/1993 | Saxena | 364/413.26 |
| 5,224,036 | 6/1993 | Ito et al. | 364/413.13 |
| 5,224,177 | 6/1993 | Doi et al. | 382/54 |
| 5,231,580 | 7/1993 | Cheung et al. | 364/413.13 |
| 5,270,530 | 12/1993 | Godlewski et al. | 250/208.1 |
| 5,289,374 | 2/1994 | Doi et al. | 364/413.13 |
| 5,289,520 | 2/1994 | Pellegrino et al. | 378/37 |
| 5,297,036 | 3/1994 | Grimaud | 364/413.13 |
| 5,305,365 | 4/1994 | Coe | 378/37 |
| 5,319,549 | 6/1994 | Katsuragawa et al. | 364/413.13 |

FOREIGN PATENT DOCUMENTS

| | | | |
|---|---|---|---|
| 0609922 | 8/1994 | European Pat. Off. | G06K 4/46 |
| 91/07135 | 5/1991 | WIPO | G06K 9/46 |

OTHER PUBLICATIONS

"Computerized Detection of Clustered Microcalcifications in Digital Mammograms," Medical Physics, vol. 19, No. 3, May/Jun. 1992, Wu et al., pp. 555–560.

"Application of the EM Algorithm to Radiographic Images," Medical Physics 19(5), Sep./Oct. 1992, Brailean et al., pp. 1175–1182.

(List continued on next page.)

Primary Examiner—Andrew Johns
Attorney, Agent, or Firm—Weil, Gotshal & Manges LLP

[57] ABSTRACT

A system and method for diagnosis of living tissue diseases is described. The system includes a computer device for controlling its operation. An operator control device is coupled to the computer device. A viewing screen is coupled to the computer device for displaying digitized images of the living tissue. The operator, using the control device, selects desired portions of the digitized image for further image enhancement according to a desired image enhancement feature selectable from a plurality of image enhancement features. The image enhancement features include any combination of grey scale stretching, contrast enhancement based on logarithmic histogram equalization, spot enhancement and magnification. The system further includes means for visualization and quantification of micro-calcifications, and means for visualization and quantification of mass spiculations.

61 Claims, 16 Drawing Sheets

OTHER PUBLICATIONS

"Comparsion of Digital and Conventional Mammography: a ROC Study of 270 Mammograms," Med. Inform. (1992), vol. 17, No. 2, pp. 125–131, Nab et al.

"Computer Vision and Artificial Intelligence in Mammography," American Roentgen Ray Society, Mar. 1994, Vyborny et al., pp. 699–708.

"Computer–aided Dectection of Clustered Microcalcifications: An Improved Method for Grouping Detected Signals," Medical Physics, vol. 20, No. 6, Nov./Dec. 1993, Nishikawa et al. pp. 1661–1666.

"Computer Aids to Mammographic Diagnosis," The British Journal of Radiology, vol. 60 Sep. 1987, Gale et al., pp. 887–891.

"Expert Learning System Network for Diagnosis of Breast Calcifications," by Edward A. Patrick, et al., Investigative Radiology, vol. 26 Jun. 91 pp. 534–539.

"Computers Aid Diagnosis of Breast Abnormalities," Diagnostic Imaging, Jun. 1993, Giger et al., pp. 98–102.

"Automatic Detection and Segmentation of Microcalcifications on Digitized Mammograms," by Anne Strauss, et al., IEEE Publication, Feb. 1992, pp. 1938–1939.

"Computer–Assisted Analysis of Mammographic Clustered Calcifications," by I.M. Freundlich, et al., no date.

"Computer–aided Diagnosis," by Maryellen L. Giger, from Kurt Rossmann Laboratories for Radiologic Image Research, University of Chicago, pp. 257–270, no date.

"Artificial Neural Networks in Mammography: Application to Decision Making in the Diagnosis of Breast Cancer," Radiology, Apr. 1993, Wu et al., pp. 81–87.

"Region–Based Contrast Enhancement of Mammograms," IEEE Transactions On Medical Imaging, vol. 11, No. 3, Sep. 1992, Morrow et al., pp. 392–406.

"Classifying Mammographic Lesions Using Computerized Image Analysis," by Judy Kilday, et al., IEEE Tras. Med. Imag. V12, N4, Dec. 1993, pp. 664–669.

"Segmentation of Microcalcifications in Mammograms," by Joachim Dengler, et al., IEEE Trans. Med. Imag. vol. 12, No.4, Dec. 93, pp. 634–642.

"Automatic Screening of Plain Film Mammography," by Knud Erik Fredfeldt, et al., Seminars in Ultrasound, CT, and MRI, Apr. 1992, vol. 13, No 2, pp. 135–139.

European Search Report for Application No. EP94305925.

"Displaytool: An Image Display Utility for Sun Workstations," by Hsuan Chang, et al., Proceeding of SPIE; Conf.: Medical Imaging II, vol. 914–B, Jan. 1988. pp. 1210–1216.

"Work Station For Radiologists," by T.P. Belikova, et al., *Digital Image Processing In Medicine, Remote Sensing and Visualization of Information,* Apr. 1992, pp. 99–101.

SYSTEM AND METHOD FOR DIAGNOSIS OF LIVING TISSUE DISEASES USING DIGITAL IMAGE PROCESSING

FIELD OF THE INVENTION

The present invention relates to a diagnostic workstation, and more particularly to a computer assisted system and method for the detection and diagnosis of living tissue diseases.

BACKGROUND OF THE INVENTION

Breast cancer affects a major segment of the female population over the age of 40. To reduce the mortality from this disease, it is vital to diagnose it as early as possible. If breast cancer is detected early enough, chances of cure are markedly higher. Accordingly, breast cancer screening projects designed for early detection of breast cancer have proven to dramatically reduce the mortality from the disease. Because breast cancer is such a major public health problem, many health authorities worldwide recommend that women undergo routine breast examination.

Today, the standard methods for detecting breast cancer are 1) self examination; 2) clinical examination, and 3) radiography of the breast, known as mammography. Routine mammography screening can reduce mortality from breast cancer. The American Cancer Society recommends that a baseline mammogram be taken between the ages of 35 and 39, every one to two years between the ages of 40–49 and annually on women aged 50 years and older.

The main objective of screening mammography is to detect breast cancer early, before it is palpable. The standard mammographic procedure is to take two views of each breast with specially designed mammography equipment. The breast is optimally positioned so that as much tissue as possible can be examined. The radiologist visually examines the mammographic images on a light box. Using a magnifying glass, the radiologist examines each image in detail. If the radiologist detects any suspicious findings on mammographic examination, he or she may suggest a biopsy of the suspicious area. Suspicious findings include any abnormalities in the breast tissue. Abnormalities may be either malignant or benign, and many times the radiologist cannot diagnose precisely the type of abnormality from the image. Additionally, it has been established that 10–30% of women who indeed have breast cancer have negative mammograms.

There are four possible outcomes in screening mammography:

1) True positive: Earlier detection, treatment and better prognosis;

2) True negative: Reassurance of no cancer;

3) False positive: Anxiety and time, cost and risks of more tests, and

4) False negative: Delay in diagnosis and treatment. Worse prognosis.

The technical interpretive expertise of the radiologist is a crucial factor in effective breast cancer detection. A standard non-invasive procedure does not exist to diagnose a patient after a finding has been detected by mammography. When there is a suspicious finding, a biopsy is frequently performed. Because the information on the mammogram many times is ambiguous, in order not to miss the diagnosis of cancers, many biopsies are performed for mammographic abnormalities. Approximately 70% of these biopsies turn out to be benign.

Although there have been many improvements in the mammographic equipment over the last 10 years, technical impediments limit the ability of mammography to display the finest or most subtle details in good contrast. In order to achieve specific diagnoses the radiologist needs to visualize the infrastructure of the mammographic abnormality.

Currently, cancers imbedded in dense breast tissue are found at later stages than those in breasts with high fat percentage of tissue. These cancers in dense breasts, in particular, need an earlier detection method. Although radiologists specializing in mammography have stated that the constraints of conventional mammography can be overcome by digital image processing, an effective digital diagnostic assistance approach has not yet been available.

SUMMARY OF THE INVENTION

The combination of advanced imaging technology with image processing and analysis in the proposed mammographic workstation enables radiologists to detect cancer at its earliest stages and to eliminate many unnecessary biopsies.

The system is designed to support radiologists' analyses by characterizing equivocal and suspicious findings detected on routine mammograms, so as to improve visualization of the suspected finding and to quantify the mammographic features of suspected lesions.

While the system according to the present invention is intended to assist radiologists in diagnosing breast cancer more accurately, reliably, and objectively, it could, also be utilized in the detection and analysis of cancer of other body parts.

The digitization processes for mammography applications have been developed to assist the physician in needle guided biopsies. In addition, on-going research is mainly dedicated to automating the lesion detection process. In contradistinction thereto, the present invention is based in part on the view that a computer cannot locate lesions as efficiently and reliably as the radiologist. Accordingly, the system, by enhancing the visual appearance of a region of interest in the mammogram, assists radiologists by improving their diagnostic accuracy, and hence, diagnostic effectiveness. However, as an alternative feature, the system by analyzing the entire mammogram can also automatically diagnose the presence of a tumor and determine malignancy, with a certain degree of reliability.

In accordance with the present invention there is therefore provided a system for diagnosis of living tissue diseases, comprising a computer, a memory, an operator control device, a viewing screen, and a scanning device for digitizing mammograms and for applying the digitized information to the computer for storing, displaying and further processing. The computer includes circuit means enabling on-line display of selected portions of a scanned mammogram as modified to one or more selectable features. These features include grey scale stretching, contrast enhancement based on logarithmic histogram equalization, spot enhancement and magnification. The computer further includes an option for visualization and quantification of micro-calcifications and mass spiculations.

The invention further provides a method for diagnosis of living tissue diseases, including the steps of providing a digital image of a tissue to a computer; storing the digital image in a memory coupled to the computer; displaying the digital image on a viewing screen; manipulating a computer controlled pointing device for selecting a portion of the digital image; enhancing the image contained within the selected portion according to one or more options from a plurality of image enhancement features including grey scale stretching, contrast enhancement based on logarithmic histogram equalization, spot enhancement and magnification. The method further including steps for visualizing micro-calcifications and mass spiculations and quantifying the micro-calcifications and the mass spiculations.

The invention will now be described in connection with certain preferred embodiments with reference to the following illustrative figures so that it may be more fully understood.

DETAILED DESCRIPTION OF THE DRAWINGS

Figure 1:
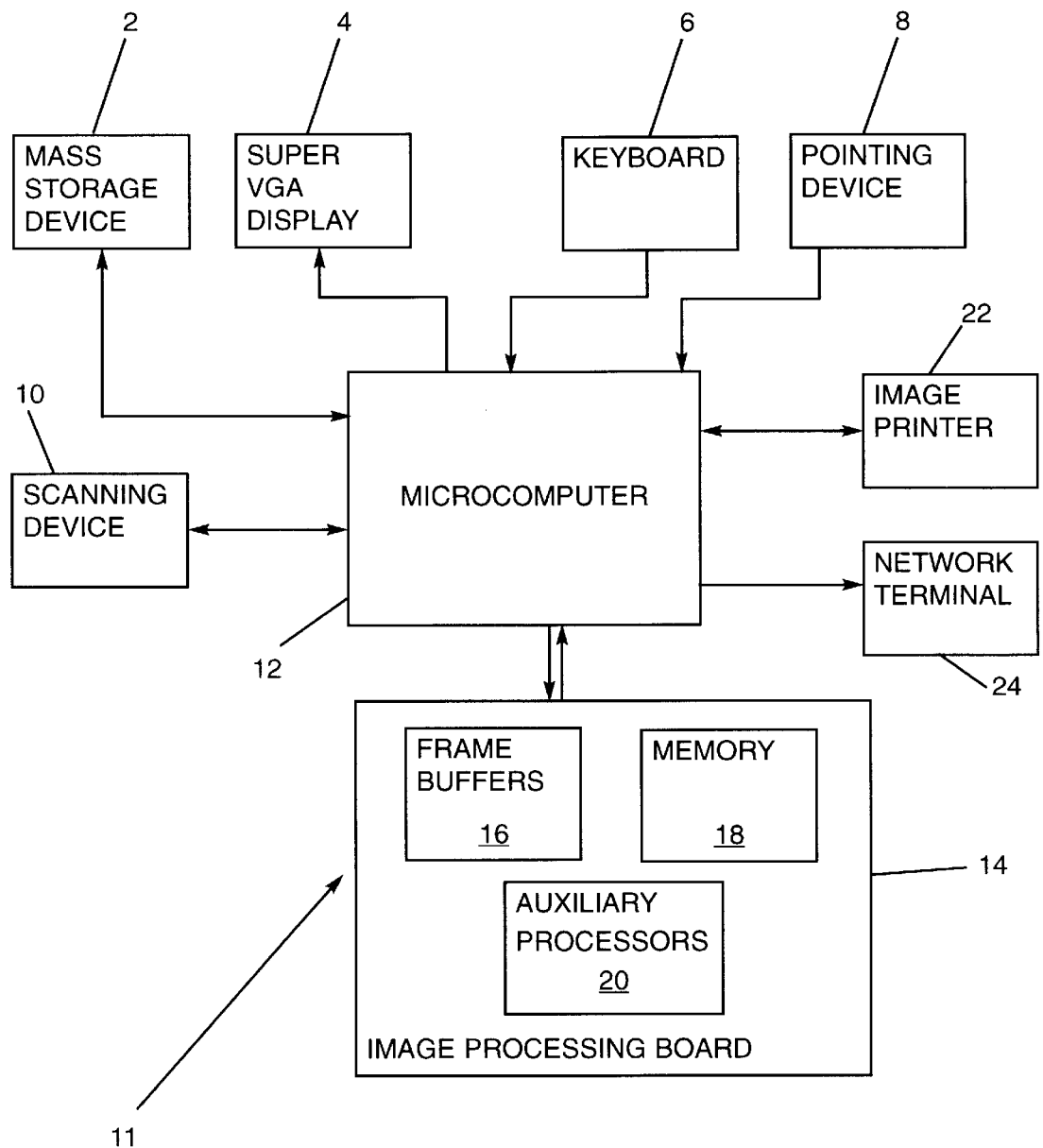
FIG. 1 is a block diagram of the system for diagnosis of living tissue diseases, according to the present invention.

FIG. 1 illustrates a system 11 for the detection and diagnosis of diseases of living tissues, in particular, breast cancer. The system includes a memory or mass storage device 2, a high resolution, non-interlaced, super-VGA display 4, a keyboard 6 and a pointing device 8. The system further includes a scanning device 10, constituting an input to a PC AT compatible microcomputer 12. The device 10 is capable of scanning mammograms of different sizes and of providing resolutions of up to 800 dots per inch, which enables the digitization of living tissue radiograph, e.g., a breast radiograph or mammogram. Such resolution translates into a digital image with pixel sizes of about 30 to 40 microns. The microcomputer 12 communicates with an image processing board 14, having an image capacity of 1024×1024 bits or more, which is incorporated into the microcomputer 12. The board 14 includes a frame buffer 16, a memory 18 and auxiliary processors 20 supporting image processing algorithms. The output from the microcomputer 12 may include an image printer 22 and/or a network terminal 24 for electronic communication with other locations, such as other clinics.

In operation, the user first scans the X-ray or the mammogram by the scanning device 10. The system yields a converted digital image and displays the digital image on display 4. Display 4 displays the digitized image as well as the menus and the text. Display 4 receives signals which represent a combination of the "VGA" mode and the "Image" mode.

The user inspects the displayed digital image, to locate region or regions that appear to be suspicious. These regions are referred to as regions of interest ("ROI"). The user uses the pointing device 8 to define a region of interest ROI on the displayed digital image. For example, by moving the pointing device 8, the system draws a frame on a portion of the digital image, which includes the ROI. The user then according to the present invention, chooses a specific image enhancement feature to enhance the image in the defined region of interest. The operation of the enhancement process is interactively controlled by the user by means of the pointing device, until the displayed appearance of the processed region on the screen is optimized. Additional means can be used to magnify the whole image or specific regions thereof, so that small details can be more clearly visualized. These means enable the radiologist to point out on the display the suspected findings on which further analysis may be required.

In order to better characterize suspected findings and obtain objective analysis thereof, the system also provides means for quantitative measurement. The quantitative analysis can be performed either on micro-calcification clusters or on high density masses in the tissue. In utilizing these further means, the user defines the area containing the suspected findings and chooses the features to be measured.

The enhanced information, i.e., images and the numbers characterizing the suspected findings, may be stored, printed, or transmitted through an electronic network to other physicians. Different features of the system will be described in further detail hereinafter.

Scanning Process

In the illustrated embodiment of the invention, the high resolution scanning device 10 is used to scan a mammogram film image to provide a digitized image with pixels having shades of grey, within a 256 grey scale. A preferred scanning device 10 is a line CCD flat bed scanner. The digital image is displayed on screen 4. The system 11 is used to overcome the main visual restrictions of the displayed images, including local low contrast, and small dimensions of suspected findings.

Typical commercial scanners have an option to control their exposure time (E) and brightness (B). The exposure time is the time during which the mammogram is exposed to a scanning light, and the brightness is the degree of luminance of that light. Briefly, the scanning process is accomplished by automatically adjusting the variable exposure time (E), and the variable brightness (B) of the scanning device 10. Typically, the scanner scans the image several times, preferably 3 to 5 times, while the system adjusts the exposure time and brightness on each scan to provide a digital image with an optimally high contrast.

The operation of the scanning process according to the present invention is described in more detail hereinafter. The digital image at the output of scanning device 10 consists of pixels corresponding to the scanned mammogram. The scanning device assigns a grey level value from zero to 255 to each pixel based on the optical density of the corresponding point on the mammogram. The optical density is the degree of opacity of each point on the mammogram and is defined as the common logarithm of opacity. Hence, a point on the mammogram that transmits 100 percent of the light has a density of zero, a point that transmits 10 percent of the light has a density of 1, and so forth.

One characteristic of the scanning process, which defines the quality of the digital image is the brightness range, which corresponds to the contrast of the digital image. The brightness range is defined as the difference between the assigned grey levels of the darkest "black" and the whitest "white" points on the digital image. An image with an optimum brightness range is one that all the black points have a grey level close to zero, and all the white points have a grey level close to 255.

However, with available commercial scanners, a typical scan of a mammogram produces a digital image having a brightness range that is less than the optimum attainable. For example, the grey level of the darkest point on the image might be 85 and the grey level of the brightest point on the image might be 150.

The system optimizes the brightness range of the digital image by varying the two parameters exposure time (E) and brightness (B) of the scanning device according to a novel optimization method.

The grey level of each pixel of the digital image varies as a function of the exposure time (E) and brightness (B). The brightness range of the digital image is defined as Gmax (E,B)−Gmin(E,B)

where, Gmax (E,B) and Gmin (E,B) are respectively the maximum and minimum grey level of pixels in the image scanned under a given exposure time E and brightness B.

The range of the brightness B and exposure time E varies and depends on the scanning device. For the scanning device utilized in the preferred embodiment of the present invention, the brightness range of the scanning device is from −100 to 100, and the exposure time range is from 0 to 255. For a given exposure time Eo, the minimal brightness value (Bmin=−100) provides the minimum value for Gmin, i.e., (Gmin (Eo, Bmin))=min {Gmin (Eo, B)} and the maximal brightness value {Bmax=100} provides the maximal value for Gmax, i.e., (Gmax (Eo, Bmax))=Max {Gmax (Eo, B)}. Similarly, for a given brightness Bo, the minimal exposure time value (Emin=0) provides the minimal value for Gmin, i.e., (Gmin (Emin, Bo)=min {Gmin (E, Bo)} and the maximal exposure time value (Emax=255) provides the maximal value for Gmax, i.e., Gmax (Emax, Bo)=Max {Gmax (E, Bo)}.

Thus, the grey level G of each pixel of the digital image of a mammogram is a function of three parameters: the two variable parameters (E) and (B) of the scanning device 10; and the optical density (OD) of points on the mammogram or the X-ray, and is defined as G=f(B, E, OD).

Figure 2:
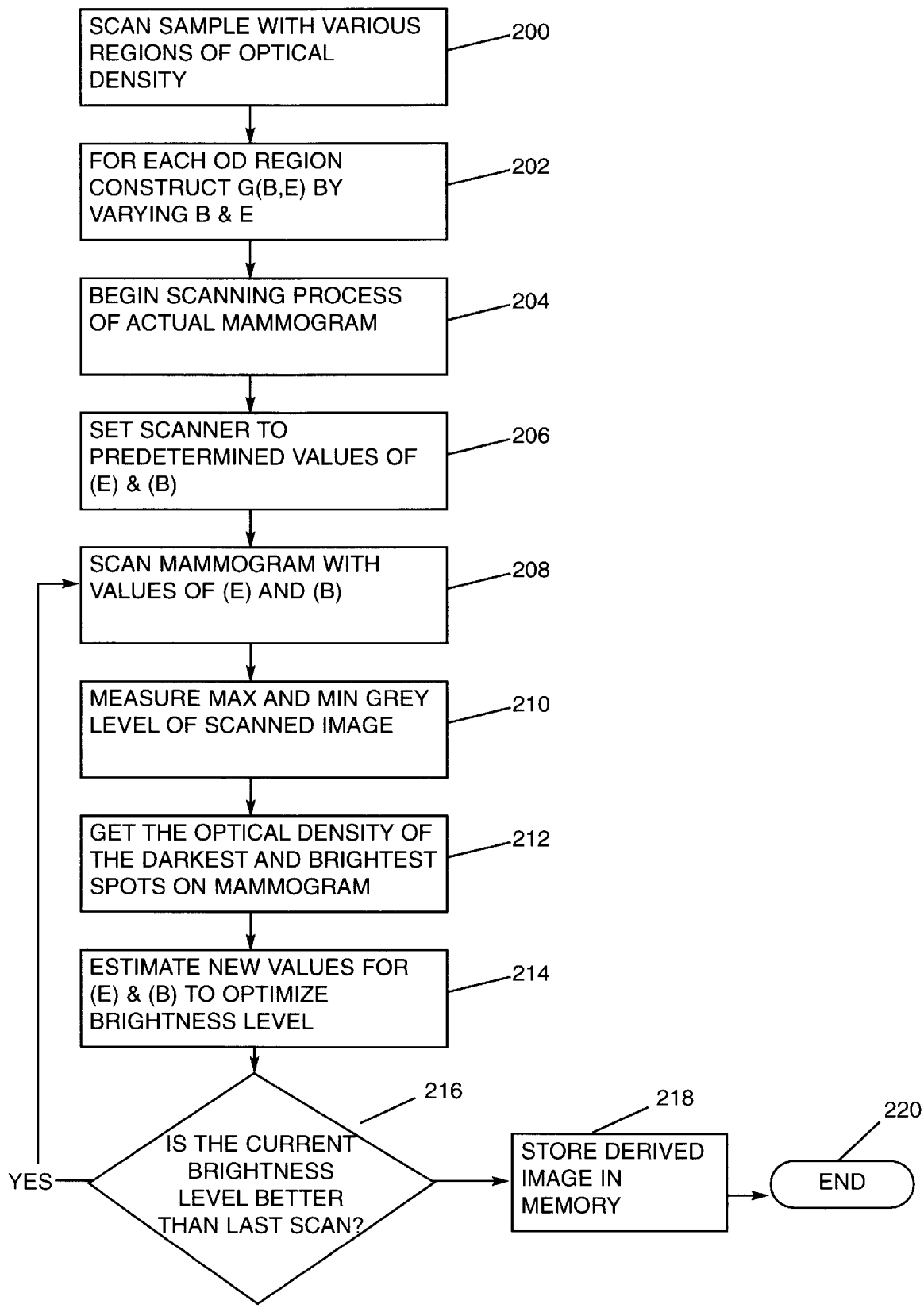
FIG. 2 is a flowchart illustrating the scanning process.

A novel method to optimize the brightness range is now described with reference to FIG. 2A. The first part of the scanning process includes steps 200 and 202, which constitute the calibration phase of the scanning device 10. The system begins at step 200 when a sample film with various regions of known optical density is placed on the scanning device for scanning. The sample film is preferably a "Kodak photographic step table No. 1A", which has 11 steps or regions of optical density with values approximately ranging from 0.05 to 3.05. It is assumed that this range completely covers the optical density range which appears on real mammograms. At step 202 the scanning device 10 repeatedly scans each region or step of the sample film having a given optical density while the exposure time (E) and brightness (B) are varied. The scanner produces a set of grey levels G(E,B) corresponding to each region or step of optical density (OD). When all the regions on the sample are scanned while varying the (E) and (B) values of the scanner, the system has stored a group of three dimensional tables each corresponding to one optical density region on the sample. The three dimensions are exposure time (E), brightness (B) and resulting grey level (G). The resulting group of three dimensional tables can be viewed in a three dimensional space as a plurality of spaced apart [(G),(E),(B)] surfaces, with each surface corresponding to a given optical density (OD). The resulting group of the three dimensional tables represents the output characteristic of the scanning device with respect to variable exposure time and brightness for a given range of optical density. These characteristics remain constant for a certain period of time, and therefore it is not necessary to repeat steps 200 and 202 every time the scanner scans a mammogram.

At step 204 an actual mammogram is placed on the scanning device 10 to begin the scanning process. In order to obtain an optimum brightness range, the scanning device performs multiple scans as explained hereinafter. At step 206, the values of exposure time (E) and brightness (B) of the scanning device 10 are set to an initial value, such that for most images, the scan yields a digital image with a fair range between Gmin and Gmax without getting saturation effects. For the scanning device used in the preferred embodiment, these initial values are B=60 and E=90. However, these values may differ from one scanning device to the other. At step 208, the scanning device scans the mammogram and stores the derived grey level of each pixel of the digital image. At step 210, the system measures the brightness range by taking the difference between the maximum and minimum grey levels of the pixels in the scanned image. The system then performs an optimization process at steps 212 and 214 to estimate new values of exposure time (E) and brightness (B) that will increase the brightness range. The process of getting the new estimates for (E) and (B) begins at step 212. Based on the values of (E) and (B) used to scan the mammogram, the system derives the extreme optical density (OD) values of the darkest and brightest spots on the mammogram from the three dimensional table G(E, B) which was derived during the scan of the film. If the system is not able to find the (OD) value corresponding to the values of (E) and (B) used during the scan, it estimates a value based on a standard interpolation routine.

Thereafter at step 214 new estimates of exposure time(E) and brightness (B) are derived, based on the knowledge of the extreme optical density (OD) values in the scanned area. The system looks for the right combination of exposure time E and brightness level B, where the distance between the corresponding points of two G(E,B) surfaces of these two (OD) values is maximum and where the scanner does not produce saturation effects. At step 216 the system determines whether the current brightness range is better than the previous one. If so another scan of the mammogram is performed at step 208 with the new values of (E) and (B) derived at step 214. Thereafter, at step 210, the new brightness range is measured based on the maximum and minimum grey levels obtained by the scan and new estimates of (E) and (B) are obtained at steps 212 and 214. The system stops the repetition of the scanning process after a predetermined number of scans. In the preferred embodiment, the system repeats the process for five times. However, the system can repeat the scanning and optimization process until no improvement in the brightness range can be achieved. At step 218, the digital image is stored in memory 18 with the optimum brightness range obtained based on the best values of the exposure time (E) and the brightness (B) of the scanning device 10. The system ends the scanning process at step 220.

Once the system stores the optimum scanned image of an X-ray or the mammogram, interactive enhancement of digital mammography images can be performed in real-time both in grey levels and in pseudo color display.

GREY SCALE STRETCHING

In order to diagnose areas of an X-ray image or mammogram effectively, the digital image from the scanning device must exhibit a high contrast. In order to enhance the contrast in a region of interest, the grey level distribution of the digital image generated by the scanning device is optimally converted to a new grey level distribution with a better contrast in the region. The conversion yields a new image having pixels with new grey levels. This conversion is referred to in the art as tone-scale transformation or grey scale stretching.

Figure 3A:
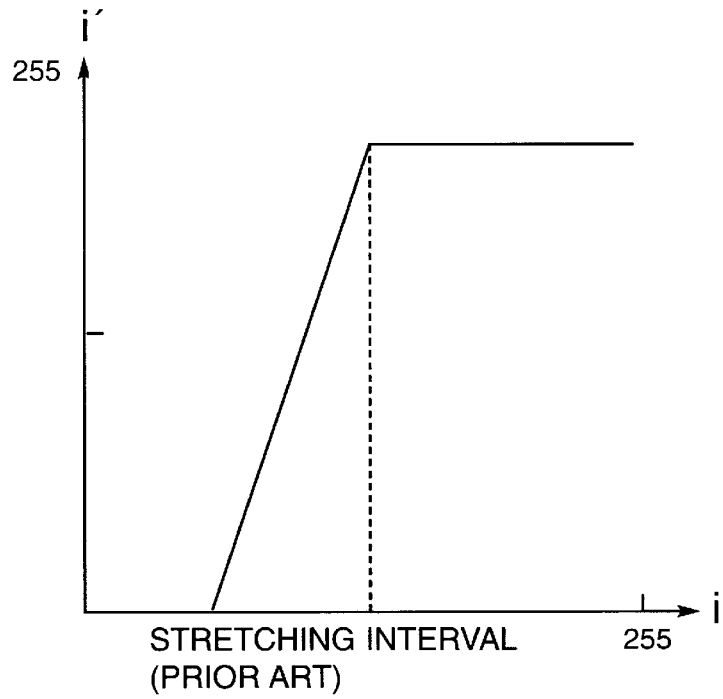
FIG. 3A illustrates a grey level conversion curve used in prior art systems.

According to one known method for grey scale stretching, it is assumed that all the necessary grey level information obtained as the result of a scan, is contained between two specific darkest and brightest grey levels within a predetermined interval. As a result of this assumption, a prior art conversion curve has the shape shown in FIG. 3A. The X axis in FIG. 3A defines the grey level values of the pixels of the digital image of the scanning device, and the Y axis defines the new grey levels of pixels of a converted new image with enhanced pixel contrast in the region of interest. As demonstrated by FIG. 3A, all grey levels outside the stretching interval are discarded in the new image because their new value after conversion is zero or 255. In the medical context, in general and for mammographic analysis in particular, the details of grey levels above and below the stretching interval cannot be neglected. Therefore, according to the present invention, a different conversion curve has been developed.

Figure 3B:
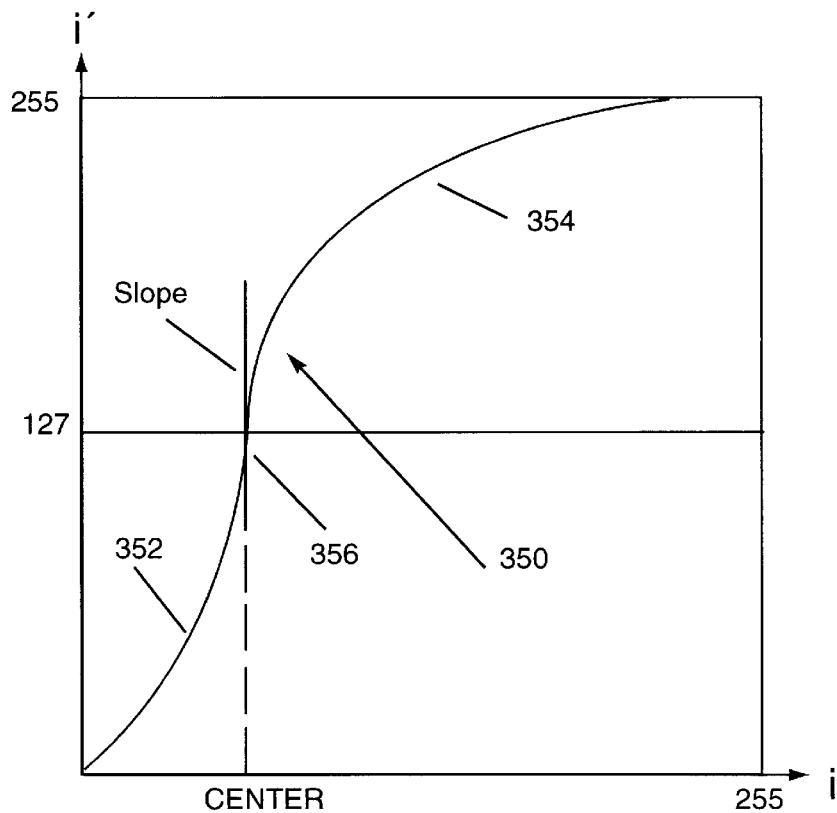
FIGS. 3B, 3C and 3D illustrate grey level conversion curves, according to the present invention.
Figure 3C:
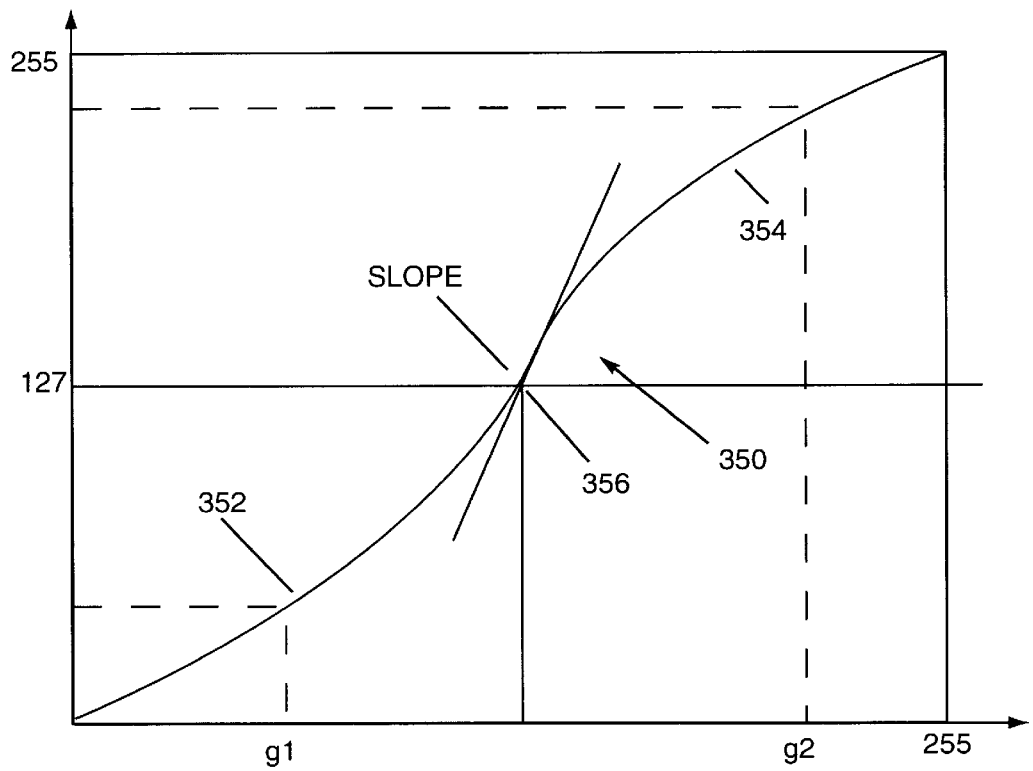
Figure 3D:
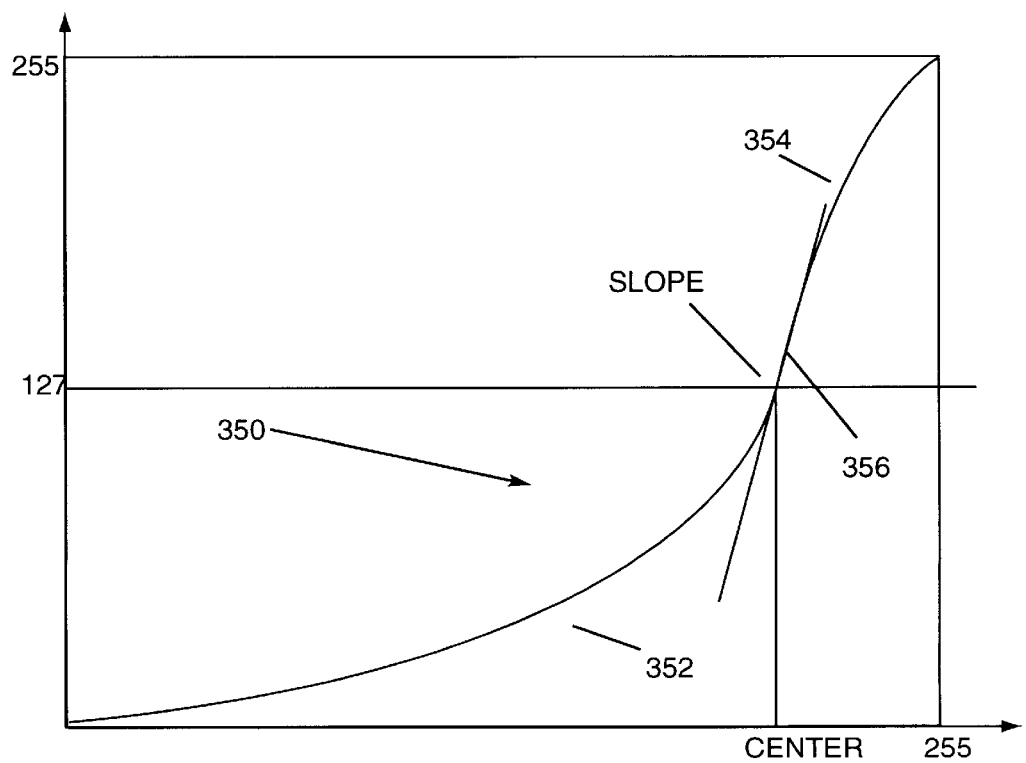

Referring now to FIGS. 3B through 3D, an S-shaped grey scale conversion curve 350 for analyzing mammogram and other X-ray images has been illustrated. The use of the S-shaped grey scale conversion curve 350 prevents the loss of information at the regions outside the two specific darkest and brightest grey levels within a predetermined interval as illustrated in FIGS. 3B–3D and provides an optimum contrast for pixels present in the region of interest. Subsequently, grey scale conversion curve 350 defines a Look Up Table which converts grey level values of the scanned image into new grey level values for a converted image with enhanced contrast in the region of interest.

Curve 350 is derived from two separate curves 352 and 354 connected together at point 356 whose X coordinate is referred to as the center of grey scale conversion curve and its Y coordinate is 127 on the new grey level scale. The center of the grey scale conversion curve is a grey level value i corresponding to the scanned image for which curves 352 and 354 convert the grey level value i to grey level value 127 on the new scale. The slope of curves 352 and 354 at the center of the grey scale conversion curve are equal to provide a smooth connection between the two curves.

The user controls the enhancement effects in real time by varying the center of the grey scale conversion curve and the slope of the two curves 352 and 354. A smaller slope at the center of grey scale conversion curve, enhances the contrast of a wider range of grey levels contained in the region of interest. Conversely, a larger slope at the center of grey scale conversion curve enhances the contrast of a narrower range of grey levels contained in the region of interest. In effect, by varying the slope at the center, it is possible to control the contrast in the new converted image.

It is also possible to control the brightness in the new converted image. For example, if the region of interest appears too bright, the center of the stretched interval is moved to the right of the curve and vice-versa. As illustrated in FIG. 3D, when the center is moved to the right, more and more grey levels, which originally had a high value, get new, lower grey level values. This makes the region of interest look darker. Conversely, as illustrated in FIG. 3B, when the center is moved to the left, more and more grey levels, which originally had a low value, get new, higher grey level values. This makes the region of interest look brighter.

The novel process of deriving the conversion curve 350 is now described in more detail. Curve 352 is an exponential curve defined as $$(Y_e(i) = a * (e^{bi} - 1))$$

The curve $Y_e(i)$ is a portion of an exponential function from i=0 to i=center of grey scale conversion curve. The boundary conditions for $Y_e(i)$ are $$Y_e(0)=0 \ ; \ Y_e(\text{center})=127; \ d(Y_e(\text{center}))/di=K$$

where K is the value of the slope of curve 352 at center $Y_e$(center), and is a desired value controlled to vary the range of grey levels with enhanced contrast. The lower limit for K is "1" for which no visual effect exists. The upper limit for K is very high, close to infinity, for which the conversion yields a digital image with a very high contrast within a very narrow range. The parameter "b" rescales $Y_e$ on the horizontal axis to match the interval of "i" values from 0 to the center. Parameter "a" rescales $Y_e$ on the vertical axis between 0 and 127.

Curve 354 is a logarithmic curve defined as:

$$Y_l(i) = 255 - c * (e^{d(255-i)} - 1)$$

The boundary conditions for $Y_l(i)$ are as follows:

$$Y_l(\text{center})=127; Y_l(255)=255; \ d(Y_l(\text{center}))/di=K$$

where K is the value of the slope of curve 354 at $Y_l$(center), which is equal to the value of the slope for curve 352 at $Y_e$(center). The lower limit for K is "1" for which no visual effect exists. The upper limit of K is very high, close to infinity, for which the conversion yields a digital image with a very high contrast within a very narrow range.

During the operation of the system, a user may select the region of interest by pointing device 8 and keyboard 6, and then activate the grey scale stretching function of the system. Microcomputer 12, prepares an initial conversion table according to curve 350 of FIG. 3C, by automatically selecting a center and a slope for conversion curve 350. Thereafter, the user may change the conversion curve by selecting a new center and slope depending on the image characteristics in the region of interest, based upon the process described above.

In order to determine the initial conversion curve 350, when the grey scale stretching function is first activated, microcomputer 12 generates the histogram of grey levels in the region of interest. The system selects two grey level values $g_1$ and $g_2$ so that 10% of the pixels in the region of interest have original grey level values below $g_1$ and 10% of the pixels in the region of interest have original grey levels above $g_2$. The parameters "center" and "slope" which determine the new grey scale, are chosen in order to allocate 80% of the new grey levels scale to the original grey level values between $g_1$ and $g_2$. Thereafter, the curve can be changed interactively by keyboard 6 or pointing device 8.

The pointing device 8 controls the contrast and brightness of the new converted image by moving vertically and horizontally. The coordinates of the pointing device are defined as Mx and My, where: 1<Mx<254, and 0<My<253. The value of Mx denotes the desired value for the center of the stretching interval and the value of My denotes the desired slope. The slope is derived from:

$$\text{slope} = tg\ (\pi/4 + My^* \pi/(4*270)) = K$$

The brightness of the new converted image varies by controlling the value of the center. Similarly, the contrast in the new converted image varies by controlling the value of the slope.

Figure 3E:
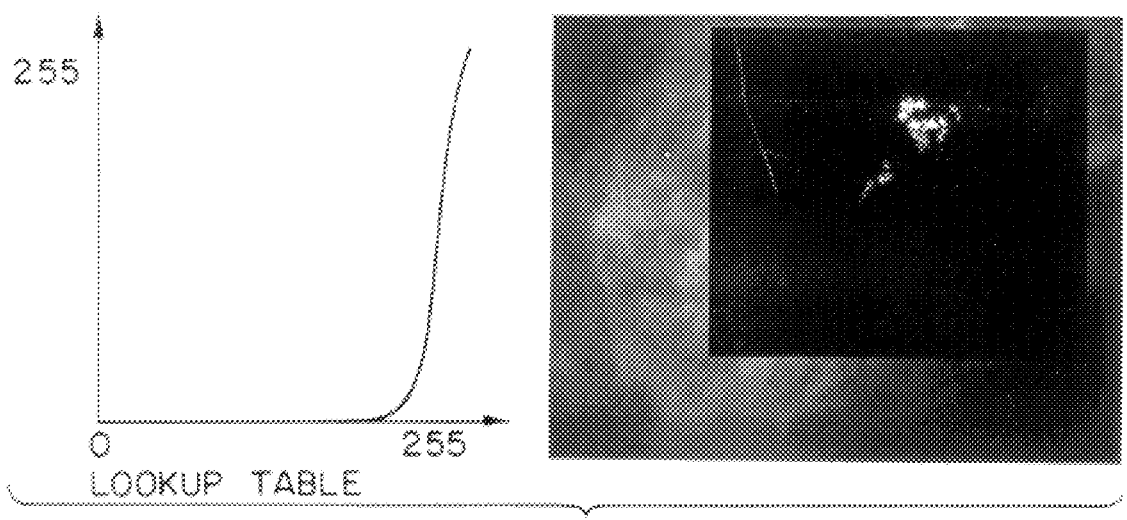
FIGS. 3E, 3F and 3G are photographs illustrating enhancement of contrast of an actual mammogram using different conversion curves according to the present invention.
Figure 3F:
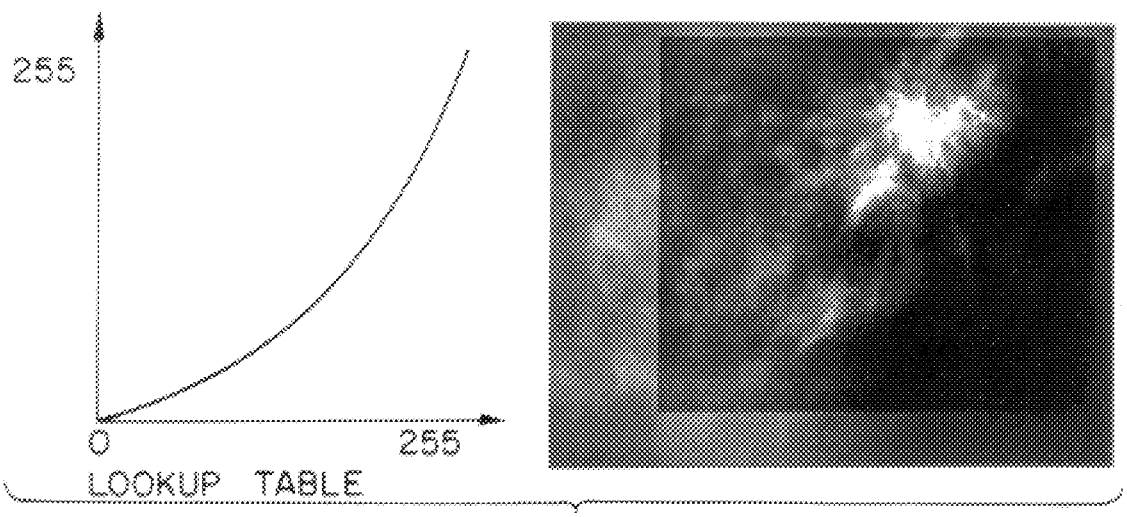
Figure 3G:
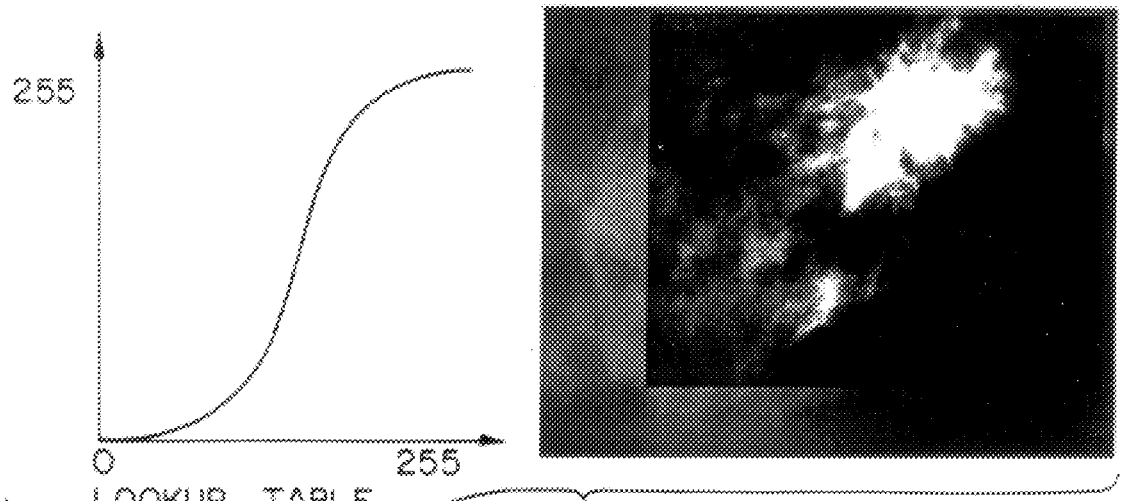

The grey scale stretching process is entirely controlled by the user and as such it enables the concentration on specific details by enhancing their contrast, as can be clearly seen in FIGS. 3E, 3F and 3G comparing the actual images obtained from a single mammogram, when using different portions of the curve 350.

Another feature of the present invention is color-grey scale stretching based on the grey scale stretching discussed above with the use of RGB components for obtaining pseudo color display. The grey levels of the original image are thus converted in such a way that white, which means high grey level, remains white, and black, which means low grey level, remains black. All the remaining grey levels between white and black are converted into pixels with different colors according to combination of RGB components. Pixels with lowest grey level after black, become green. As the value of grey levels increase the colors change to blue, violet, red, orange, yellow and finally white. Red, orange and yellow are defined as hot colors, and green, blue and violet are defined as cold colors. Thus pixels with low grey level value turn into cold colors and pixels with high grey level value turn into hot colors.

The RGB coloring is achieved through the use of a look up table, which allows the conversion of grey levels into different shades of color, based on the grey level value of each pixel.

LOGARITHMIC VARIABLE HISTOGRAM EQUALIZATION

Another method used for improving the visual contrast of a digitized image is histogram equalization. The prior art histogram equalization method, known as uniform histogram equalization, improves the visual contrast by creating a transformed image with a flat histogram. Histogram equalization can be accomplished by using a transformation look-up table applied to each pixel in the digitized image. It has been found that the transformation look-up table, which yields a transformed image with a flat histogram, is the scaled version of the cumulative histogram of the original digital image. The cumulative histogram is a graph of the sums of numbers of pixels, along the vertical axis, having grey level values equal to or less than the grey level values along the horizontal axis of the graph.

The histogram equalization method described above may not be appropriate for enhancing images on a mammogram where in some instances the purpose is to detect and accentuate bright spots in regions of interest (ROI) in the digital image against the background. Typically, these bright spots may correspond to regions of micro-calcification. Therefore it is desired to have a transformed image with a histogram that has a relatively large number of pixels with low grey level values, so that the remaining pixels with higher grey level values appear with a better contrast. In order to achieve a transformed image with such a desired histogram, the system implements a logarithmic histogram equalization as described hereinafter with reference to FIG. 4A.

Figure 4A:
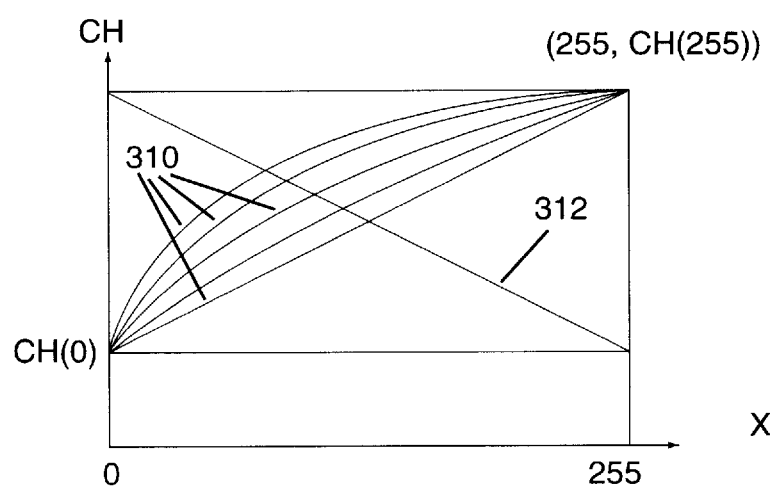
FIG. 4A illustrates a logarithmic cumulative histogram.

According to one aspect of the present invention, the system creates a new grey scale based on a variable logarithmic histogram equalization in the region of interest ("ROI") of a digital image. After the equalization process, the transformed image will have a cumulative histogram CH(x), that closely approximates one of the many exemplary cumulative histogram curves CH(x) as illustrated by curves 370 of FIG. 4A. The cumulative logarithmic histograms are defined as:

$$CH(x) = [CH(255) - CH(0)] * \left| \frac{\text{Ln}\ (x+1)}{\text{Ln}\ (256)} \right|^q + CH(0) \quad (1)$$

where "x" is a grey level value between 0 and 255, "q" is the parameter of each curve 310, which defines the degree of concavity of the graph, CH(255) is the total amount of pixels in the region of interest, after equalization CH(0) is the number of pixels with grey level value zero after equalization and Ln is natural logarithm as illustrated in FIG. 4A. Curves 370 take a different shape as the value of q varies.

The system constructs a look-up table which transforms the grey level values of the digital image in the region of interest into new grey level values with a specified cumulative logarithmic histogram according to equation (1) by utilizing an iterative process. Thus, the system iteratively calculates a plurality of look-up table transformations. The look-up table transformation that yields a converted new image with a cumulative histogram that most closely approximates the specified cumulative histogram is then selected. Since the cumulative histograms are logarithmic, the look-up table transformation curve is preferably exponential.

In an alternative embodiment, the system constructs a look-up table in accordance with the relationship:

$$LUT(x) = e^p - 1 \quad (2)$$

where LUT(x) is the look-up table transformation function and, p, a function of q, is defined as $$p = \left| \frac{ch(x) - ch(0)}{ch(255) - ch(0)} \right|^{1/q} * \text{Ln}(256)$$

where ch(x) is cumulative histogram of the digital image in the region of interest before transformation and ch(255) is the total number of pixels in the region of interest and ch(0) is the number of pixels with a grey level value of zero in the region of interest. Furthermore:

$$ch(0) = CH(0) \text{ and } ch(255) = CH(255)$$

Thus, the look-up table also varies as a function of q. In one embodiment of the present invention, the user can modify the logarithmic histogram equalization by providing a desired value of q via keyboard 6 or pointing device 8 of FIG. 1. The value of q can vary by moving the pointing device 8 along either a horizontal direction or a vertical direction. For example, if q varies based on the horizontal movement of the pointing device 8, the movement of the pointing device along the X axis is translated to a linear sliding of curve 310 along line 312 of FIG. 4A, by relationship:

$$q = \frac{\text{Ln}\left(1 - \frac{mx}{255}\right)}{\text{Ln}\frac{\text{Ln}(mx+1)}{\text{Ln}(256)}}$$

where mx is the grey level value corresponding to a given coordinate of the pointing device 8 along the horizontal axis. The value of mx is a function of the coordinates of the pointing device 8 along the horizontal axis and ranges from 0 to 255. The initial logarithmic curve 310 and the corresponding look-up table are determined according to an initial predetermined value for mx. When the system first activates variable logarithmic histogram equalization, it assigns a predetermined reference value to mx regardless of the initial coordinate of the pointing device 8. Thereafter the value of mx increases when pointing device slides to the right and decrease when pointing device slides to the left. In one embodiment, the initial predetermined value for mx is 120.

Figure 4B:
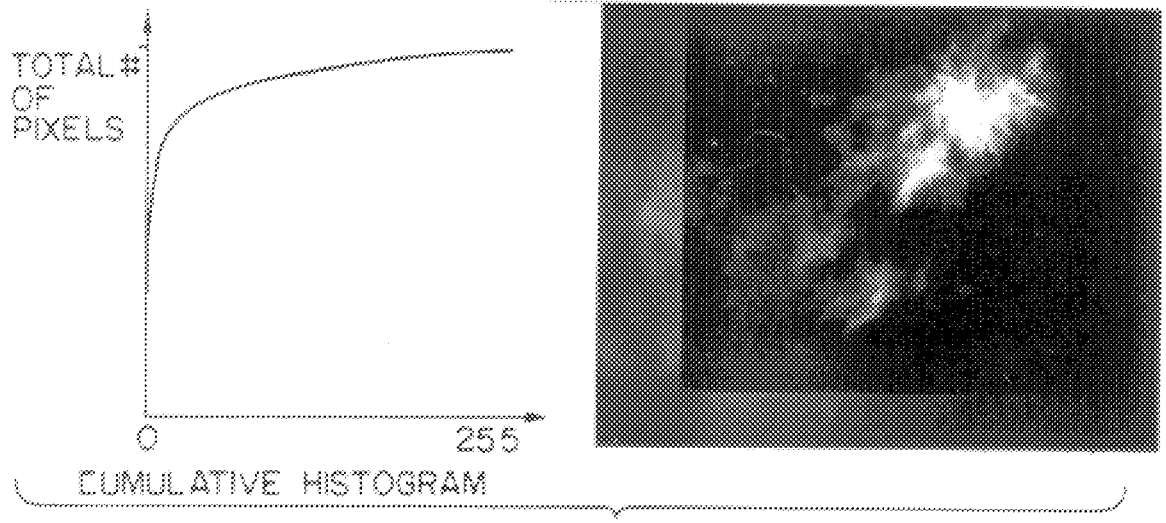
FIGS. 4B, 4C and 4D are photographs illustrating enhancement of grey levels of a mammogram utilizing different logarithmic histograms.
Figure 4C:
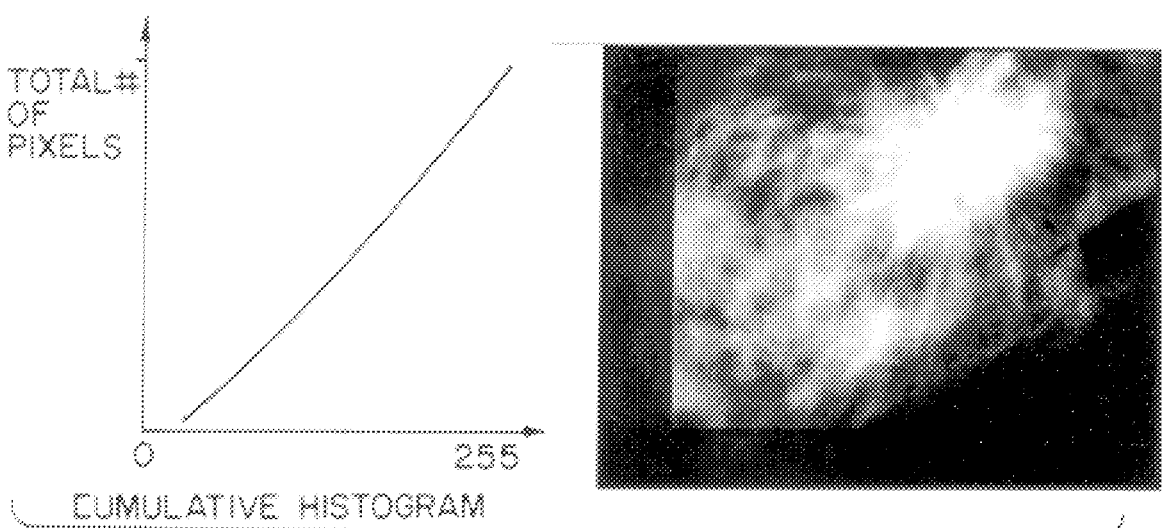
Figure 4D:
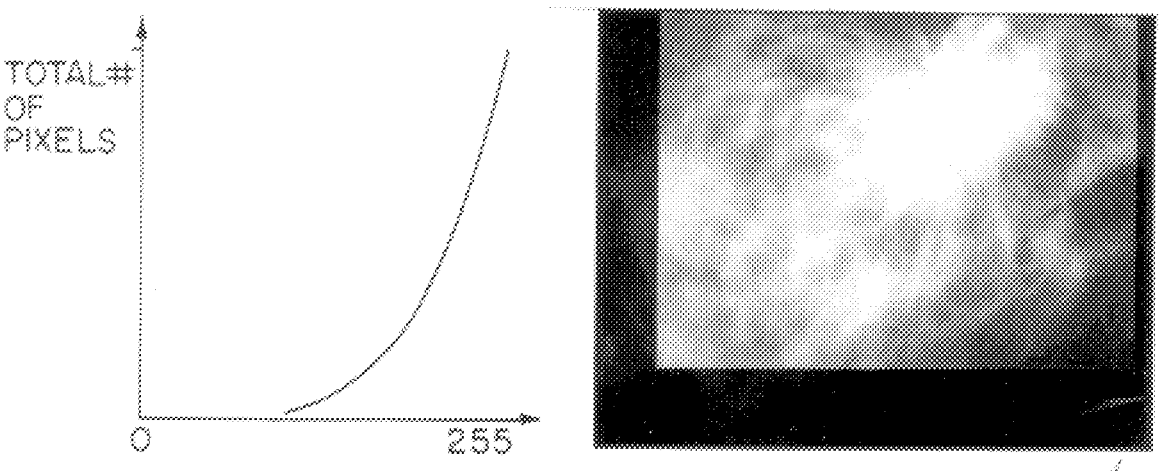

The logarithmic histogram equalization described above allows the control of the contrast in the region of interest. The brightness adjusts appropriately as different curves 310 are used to obtain a look-up table transformation function. FIGS. 4B, 4C and 4D illustrate the effect on the grey scale transformation by varying the value of q. As seen in FIG. 4C, a moderate logarithmic effect leads to an equal utilization of all grey levels, a result that is similar to a transformation based on uniform equalization. A stronger logarithmic effect will emphasize the brightest details in the region representing micro-calcifications as illustrated by FIG. 4A.

It can be appreciated that rather than calculating the value of q and the look-up table in accordance with the equations described above, it is possible to construct different look-up tables for converting the value of mx into appropriate values of q, p and LUT(x).

SPOT ENHANCEMENT

Another novel feature of the present invention is spot enhancement which is most effective when applied to regions with low contrast and relatively small size. The system checks the grey level difference between each pixel and its neighboring pixels within a region of interest. The system then modifies these differences so that large grey level differences between a pixel and its neighboring pixels are diminished and small grey level differences between a pixel and its neighboring pixels are accentuated. This process leads to an enhancement of "pixel to pixel" contrast in the region of interest defined by the user.

Figure 6A:
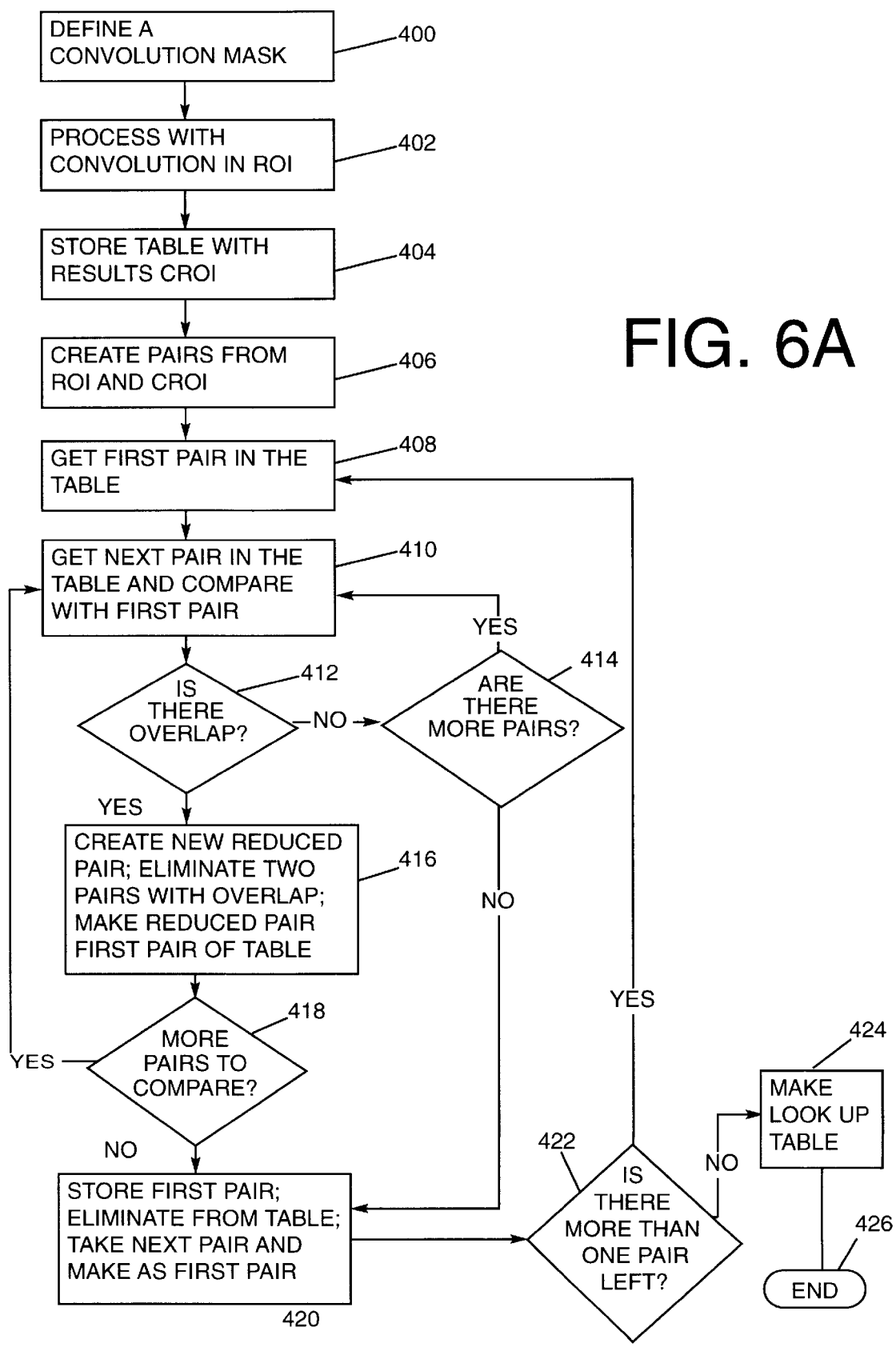
FIG. 6A is a flowchart illustrating spot enhancement process.
Figure 6B:
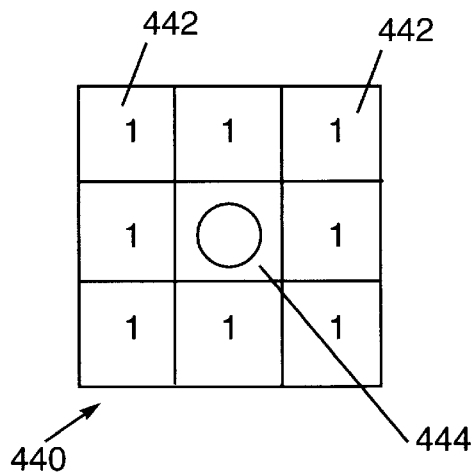
FIG. 6B illustrates a convolution mask used in the spot enhancement process.

According to one embodiment of the present invention, the spot enhancement process begins at step 400 of FIG. 6A, by filtering the digital image of a region of interest. For each grey level value of a pixel in the digital image the filter provides another grey level value whose magnitude is the average of weighted sum of grey level values of its neighboring pixels. The filtering process constitutes a convolution on the digital images with a convolution mask 440 having 9 cells as illustrated in FIG. 6B. The convolution mask measures the average value of the eight pixels 442 surrounding each pixel 444 in the digital image. Each cell surrounding a pixel has an assigned weight which in this case is the value "1". However, each cell can have other weighted values. At step 402, in FIG. 6A, the process of convolution begins for all pixels in the region of interest.

Figure 6C:
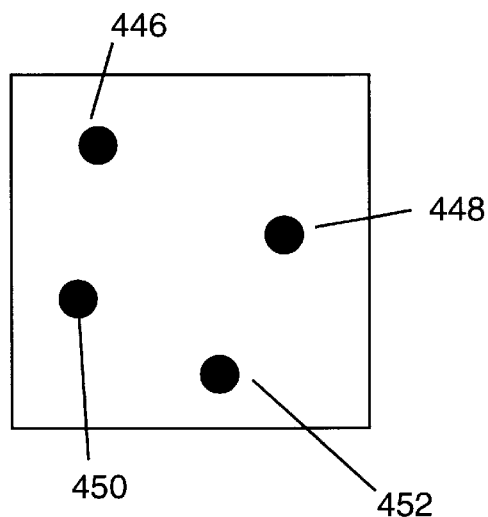
FIG. 6C and 6D illustrate two tables with elements representing the grey level value of pixels in digital image, before and after convolution used in the spot enhancement process.
Figure 6D:
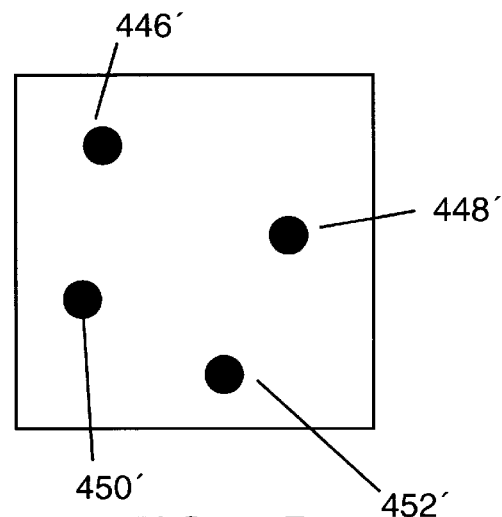

The outcome of the convolution can be visualized by referring to FIGS. 6C and 6D. FIG. 6C illustrates a table corresponding to an original digital image of the region of interest. Each element 446, 448, 450 and 452 of the table represents grey level values corresponding to the pixels of the original digital image of the region of interest. FIG. 6D illustrates a second table with the outcome of the convolution. Each element 446', 448', 450' and 452' of the second table represents the new grey level values, each new grey level value being the average of grey level values of eight pixels surrounding a pixel with grey level values illustrated in FIG. 6C.

Returning now to FIG. 6A, at step 404, the system stores the filtered table of FIG. 6D with all the grey level values derived by the convolution. The filtered table referred to in FIGS. 6A and 6D is defined as the convoluted region of interest or CROI. At step 406, the system creates a contrast table $p(f_i, g_i)$ where $f_i$ is the grey level value of pixels in the original digital image and $g_1$ is the grey level value of the corresponding pixel in the convoluted region of interest CROI. The difference in grey level value between each pair represents the amount of contrast between each pixel and its neighboring pixels.

At step 408 the system begins the process of creating a look up table by obtaining the first pair in the contrast table. At step 410 the system gets the next pair in the contrast table and compares it with the first pair. For purposes of illustration, the first pair is defined as p1(f1,g1) where f1 is the grey level value of a pixel in the digital image and g1 is the average grey level value of its surrounding eight pixels. For example, f1 may be element 446 in FIG. 6C and g1 may be element 446' in FIG. 6D. The second pair is defined as p2(f2,g2) where f2 is the grey level value of another pixel in the digital image and g2 is the average grey level value of its surrounding eight pixels. For example, f2 may be element 448 in FIG. 6C and g2 may be element 448' in FIG. 6D.

At step 412 the system determines whether there is an overlap between the first pair and the next pair in the table by comparing the f and g values of each pair with each other. An overlap constitutes the situation when f and/or g values of one pair are between the f and g values of the other pair. If there is an overlap, the system goes to step 416, eliminates the two pairs and creates a new reduced pair which substitutes the eliminated pairs.

The criteria for creating the new reduced pair is described hereinafter. Assuming that p1 and p2 overlap, the process looks at the four values in the two pairs and selects the middle two numbers as the values for the reduced new pair. For example, if f1=110, g1=180, f2=80 and g2=130, then the middle two numbers are 110 and 130. The reduced new pair gets these two numbers. The system then makes the reduced new pair as the first pair of the contrast table. Furthermore, in the case where the values of one pair are included within the values of the other pair, the smaller pair is kept as the first pair and the larger pair is removed. At step 418 if there are more pairs remaining for further comparison the system goes to step 410 until all pairs in the contrast table have been compared. The system then goes to step 420.

If at step 412 the system determines that there is no overlap between the first pair and the next pair, the system checks for more pairs at step 414 and if there are no more pairs remaining in the contrast table the system goes to step 420. If however, there are more pairs remaining in the contrast table, the system goes back to step 410 for further comparisons until all pairs in the contrast table have been compared with the first pair.

At step 420, the system stores the first pair in an input pair table and eliminates that first pair from the contrast table. The system then takes the next pair in the contrast table and makes that pair the first pair of the contrast table. At step 422, if there are more pairs remaining in the contrast table, the system goes to step 408 and begins the process again.

Figure 6E:
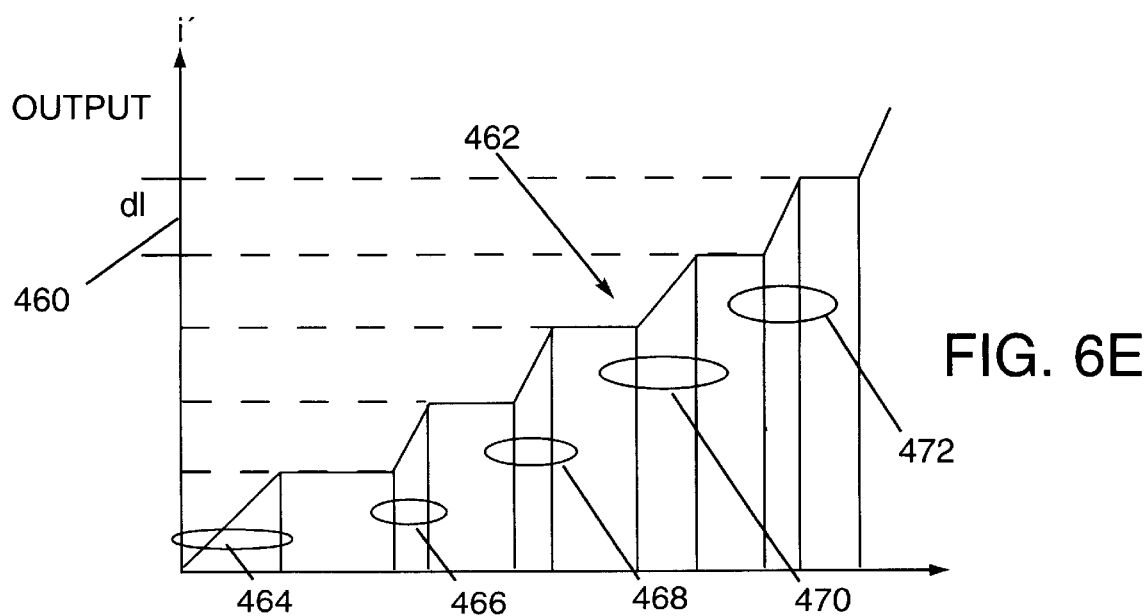
FIG. 6E illustrates a conversion curve obtained by the spot enhancement process.

If however all possible reductions have been made, the input pair table is complete and the system goes to step 424 to make a look up table. FIG. 6E illustrates a look up table 462 which is a step function. The input of the look up table is the grey levels of the digital image of a region of interest and the output is the converted grey levels creating an enhanced image. In order to derive the incremental steps 460 along the i' axis of the table, the system counts the number of the pairs in the input pair table and divides 255 by the number of the pairs to get a value "d1." For the intervals defined by each pair, the table converts the grey level values within that interval into new values, which are linearly distributed within the increment "d1" along the i' axis. Grey level values between two pairs are converted into a fixed value. FIG. 6E illustrates an example of the intervals 464, 466, 468, 470 and 472, within which grey level conversions occur. As can be seen, a large grey level difference between a pixel and its neighboring pixels as illustrated by pair 470 is diminished and a small grey level difference between a pixel and its neighboring pixel as illustrated by pair 466 is accentuated. Remarkably, the overall result is an image with an improved contrast.

Magnification

Figure 5A:
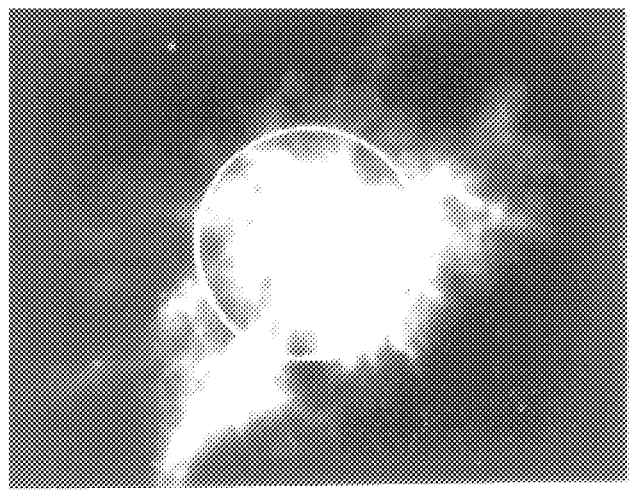
FIGS. 5A, 5B and 5C are photographs illustrating result obtained by utilizing different magnification factors of a zoomed area.
Figure 5B:
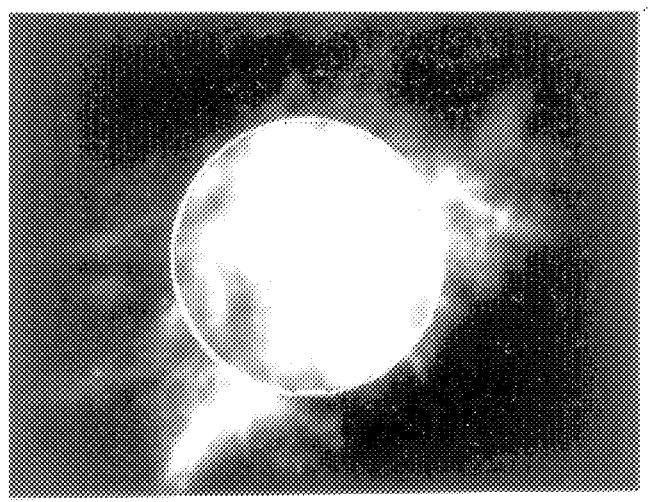
Figure 5C:
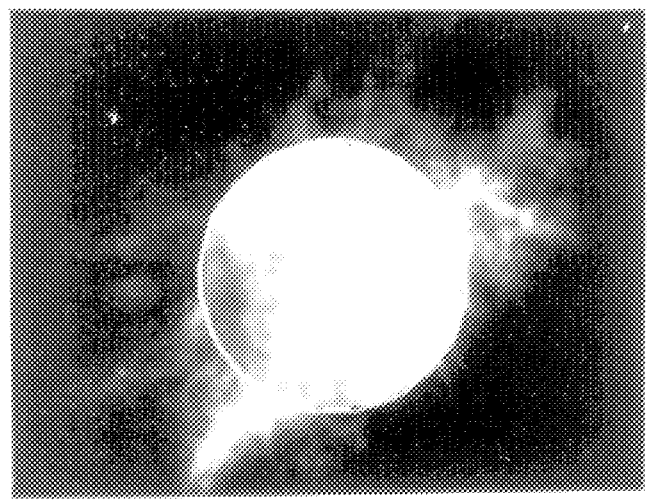

In addition to the above-described optional features, the system also provides the option of what is called in the art of photography "zooming". The zooming may be effected with either a circular or square or any other shape of a predetermined area on the image, as seen in FIGS. 5A, 5B and 5C. The zooming process has many features and advantages and can be advantageously utilized as follows: a) The dimension of the zoomed area can be changed interactively in real time; b) the location of the zoomed area on the image can be changed interactively in real time; c) the magnification factor of the zoomed area can be changed interactively in a continuous manner, i.e., without abrupt changes, in real time, as can readily be seen in FIGS. 5A to 5C; d) if the image is presently displayed on the monitor in a reduced form (i.e., lower resolution), the zooming processes uses the original image in its highest available resolution and not the actual image displayed on the monitor, e) when the magnification factor is not an integer number, the grey level assigned to each pixel is a result of the interpolation of the grey levels of all the surrounding original pixels. This feature enables the preservation of the exact proportions among the elements in the zoomed area. Additionally, it attenuates the digitization effect in case of high magnification factor.

Figure 5D:
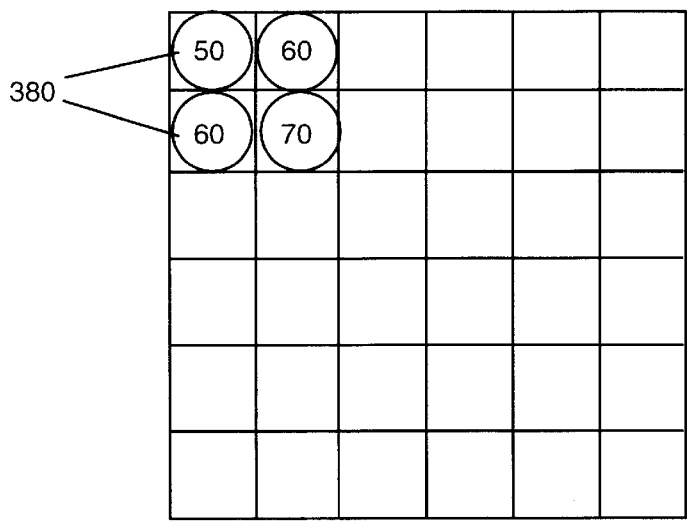
FIGS. 5D, 5E and 5F illustrate the pixels in the original image and the magnified images.
Figure 5E:
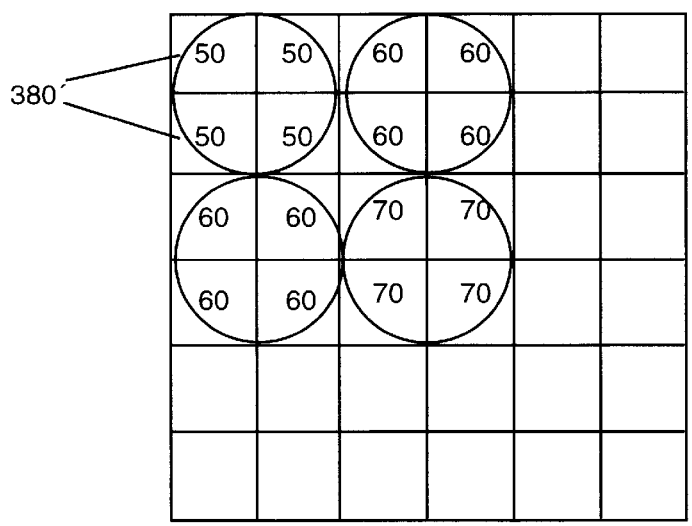

The system performs the zooming process by displaying each pixel in the original image by a larger number of pixels. FIGS. 5D and 5E illustrate an example when the system magnifies the image by a factor of 2. Each pixel in the original image SD is represented by its grey level value. Circles 380 in each pixel cell 382 in FIG. 5D represent the size of each pixel in the original image.

Pixels in the enlarged image 5E are also represented by their grey level values. As illustrated, each pixel in the original image 5D is displayed by four pixels in the enlarged image in FIG. 5E. Each of the four pixels in FIG. 5E has the same grey level value as the original pixel in FIG. 5D. Circles 380' represent the size of each pixel in the enlarged image.

Figure 5F:
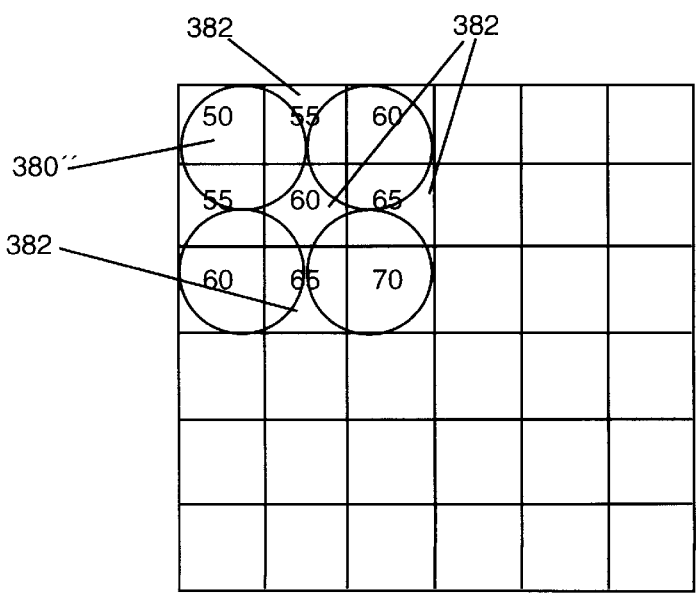

When the zooming factor is not an integer, the grey level of pixels in the magnified image are derived by interpolation. FIG. 5F illustrates an image which has been enlarged by a factor of 1.5. Each pixel occupying a cell in the original image requires 1.5 cells in the magnified image. The grey level value of pixels occupying the additional cells 382 is equal to the average value of the grey levels in the neighboring cells. Circles 380" represent the size of each pixel in the enlarged image.

SEGMENTATION AND EVALUATION OF MAMMOGRAPHIC MICRO-CALCIFICATIONS

An additional feature of the present invention is the ability to determine the structural features of micro-calcifications and evaluate those features to assist in the diagnosis of malignant micro-calcifications.

The first step in diagnosing micro-calcifications is to find an indication of their presence on the mammogram. Because micro-calcifications have a lower optical density than the ordinary tissue, they appear on the mammogram as small regions that are brighter than the surrounding region. Many times these small regions are located closely together and form a cluster.

In many occasions, certain structural characteristics of individual micro-calcifications and micro-calcification clusters can provide valuable diagnostic information. For example, micro-calcifications that appear much brighter than the surrounding region or have a smooth perimeter, tend to be benign. Other micro-calcifications that appear to have brightness very close to the surrounding region or have highly irregular shape tend to be malignant. Thus, it is very difficult to identify malignant calcifications. Further, since not every bright detail on the mammogram represents a micro-calcification, a radiologist's experienced eye is required to ascertain that a suspicious spot corresponds to a micro-calcification. Based on the structural characteristics, the radiologist determines whether the micro-calcifications are malignant.

Many times, the difference in grey level between a micro-calcification and the surrounding region is not discernable by human eyes. The radiologist, by applying the image enhancement features described before, including grey scale stretching, spot contrast enhancement, logarithmic grey scale equalization and magnification, views the digital image. The image exhibits a better contrast as a result of these enhancement features. This assists the radiologist to identify suspicious areas on the mammogram image that may contain micro-calcifications.

As an additional feature to identify micro-calcifications, the system allows the radiologist to determine the grey level value of a given pixel. This allows the radiologist to compare quantitatively the densities of two areas, to identify areas in increased optical density that may not be apparent due to surrounding high density tissue.

Another feature that assists the radiologist to identify micro-calcifications is a display of grey levels along a given line or the image. The radiologist by using the pointing device 8 of FIG. 1, defines a line on the image. The grey level value of all the pixels along the defined line is then displayed on the screen. This allows the radiologist to compare quantitatively the densities of the points along the defined line to identify points with increased optical density that may not be apparent due to the surrounding high density tissue.

The radiologist, by using the pointing device 8, causes the system to draw a frame on a portion of the digital image that includes the suspicious area, and is referred to as the region of interest ROI. The system then engages in processing the image defined by the region of interest ROI. In order to eliminate the effect of the background image on the appearance of the spots that represent a micro-calcification, the system first applies a background suppression routine in the whole digital image. Based on the background suppressed images, the system allows the operator to define the micro-calcifications interactively, in real time, by trimming a grey level threshold. All the pixels above the grey level threshold are highlighted preferably by color as micro-calcifications. By lowering the threshold, more micro-calcifications can be viewed. Conversely by raising the threshold, less micro-calcifications can be viewed.

Once the threshold trimming method localizes the micro-calcifications, the system performs a novel "region growing" process to estimate the contour of the micro-calcifications and produce an image having spots representing micro-calcifications which closely approximate the contour of the actual micro-calcifications in the breast tissue. Thereafter, the system calculates various structural parameters associated with individual micro-calcifications and micro-calcification clusters. By comparing the calculated parameters with a set of statistically significant parameters that have been previously derived, a physician can ascertain malignancy of the micro-calcifications.

In the alternative, the system automatically analyzes the digital image of a mammogram and determines the presence of micro-calcifications. The system then applies the "region growing" process to define the contour of the micro-calcifications and thereafter calculates various structural parameters associated with individual micro-calcifications and micro-calcification clusters. The calculated parameters are then compared with a set of statistically significant numbers to determine whether a particular micro-calcification or a micro-calcification cluster, identified by the system, is malignant or benign.

Figure 7A:
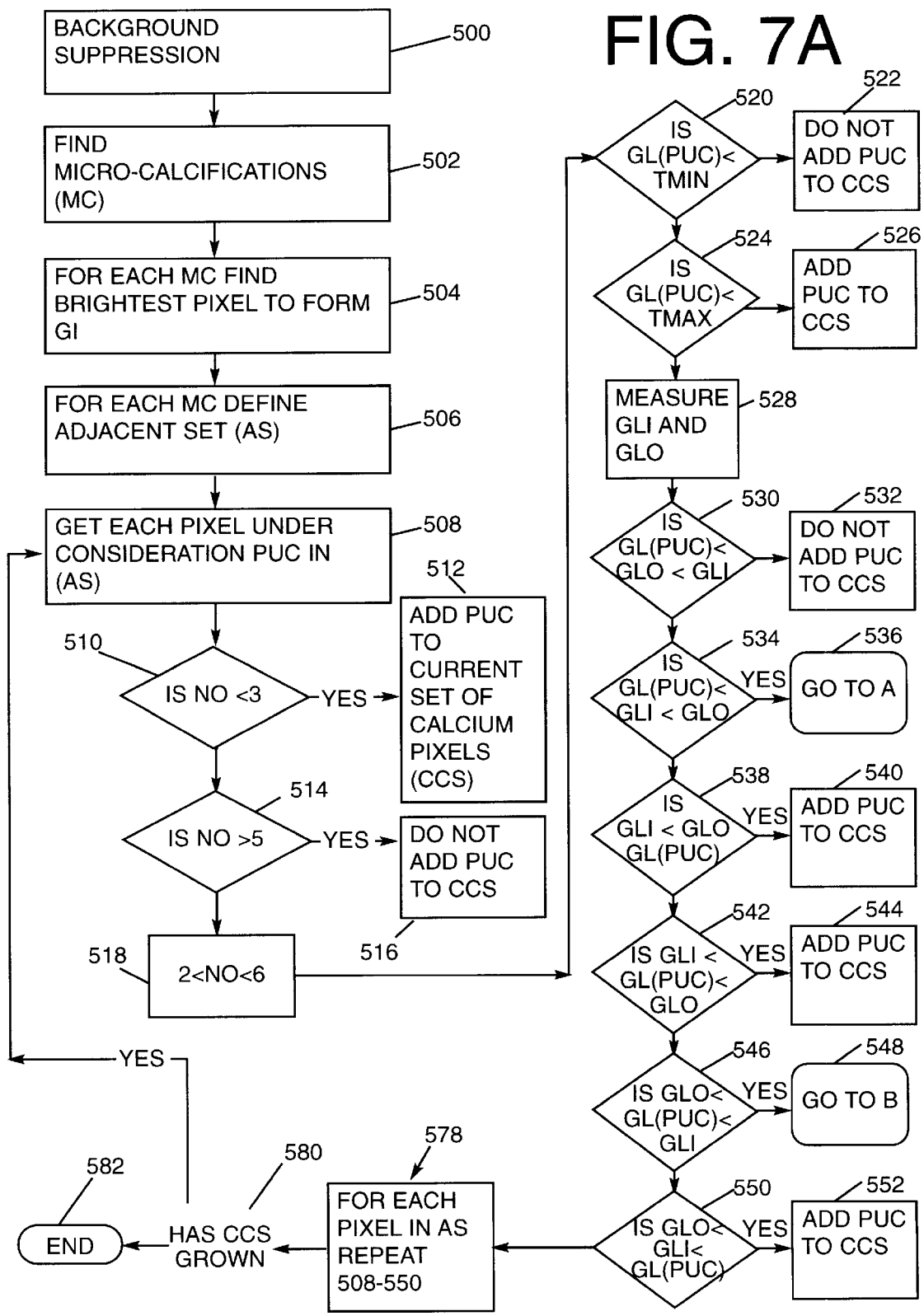
FIG. 7A is a flowchart illustrating detection and quantification of micro-calcifications.
Figure 7B:
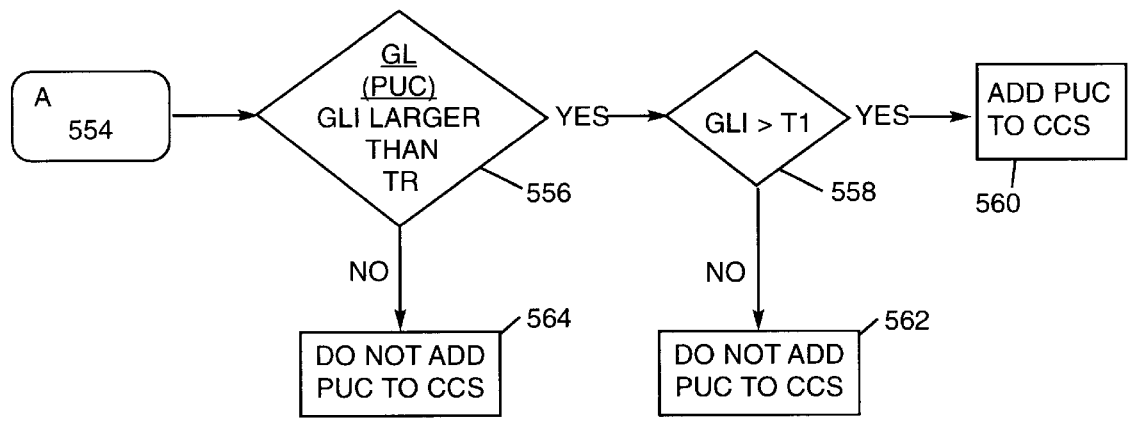
FIG. 7B is a continuation of FIG. 7A.
Figure 7B:
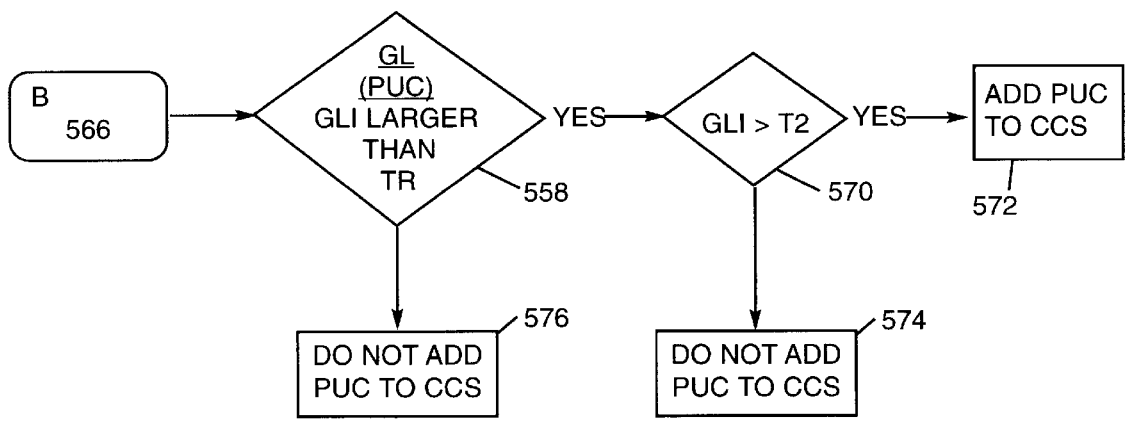

The process of identifying and quantifying micro-calcifications is described in more detail hereinafter. As illustrated by FIGS. 7A and 7B, the system begins the segmentation and evaluation of micro-calcifications at step 500 by first performing a background suppression routine to the digital image of the mammogram. Since the micro-calcifications appear against a non-uniform background in the image, the system first subtracts the background information from the original digital image. This is accomplished by filtering the digital image using a convolution mask. The convolution mask preferably is a square and symmetric matrix filled with "1"s.

The size of the mask is obtained, in pixels, in accordance with the scanning resolution and the maximum average size of micro-calcifications which is about 0.45 mm, following the relationship $$X[\text{pixels}] = \frac{0.45 \text{ mm} \times DPI}{25.4}$$

Where X is the size of the convolution mask for the background suppression routine, in pixels, and DPI is the resolution of the scanning process in dots per inch. This number is divided by 25.4 mm/inch to yield the resolution in dots per millimeter. The 0.45 mm represents the maximum average size of a micro-calcification region. Because the resulting filtered image could be noisy, the system preferably applies an additional low-pass filtering, after background suppression, using a convolution 3×3 mask.

After obtaining a background suppressed image, the system begins the process of identifying micro-calcifications in a region of interest (ROI) in the image. At step 502 the system looks for micro-calcifications (MC) on the mammogram which contain some connective set of micro-calcification pixels according to the condition:

$$\frac{GL(MC)}{GL(R-MC)} > K > 0$$

Where GL is the grey level of a pixel or the average grey level for a set of pixels, MC represents a micro-calcification having a connective set of pixels identified as micro-calcification pixels with grey levels above a given grey level threshold M and a diameter between 0.05 mm to 0.5 mm. R is a region on the mammogram that contains micro-calcifications MC, and K is a given positive value. The diameter of a micro-calcification MC is in the range of 0.05 to 0.5 mm.

Once micro-calcifications MC in regions R have been identified, they can be visualized on the system's screen preferably by a given color such as blue or red. The micro-calcifications MC appear as bright spots in the region of interest.

The system also quantifies the micro-calcifications MC by estimating their contour and by calculating certain relevant parameters associated with each micro-calcification or micro-calcification clusters. A novel aggregation technique, or "region growing," is used for this purpose. First, an initial subset of micro-calcification pixels with grey level values exceeding a given number is selected and defined as current set of calcium pixels or "current calcium set" (CCS). The CCS is the subset of micro-calcification pixels which are considered to belong to a micro-calcification MC at a certain step of the process. At step 504, for each micro-calcification, the brightest pixel is selected, together with its eight nearest neighbors, to form the "growth initiator" (GI)region. The GI region is the place from which the pixel aggregation starts. It can be appreciated that the growth initiator region can have various sizes.

The system by applying the region growing method of the present invention considers and analyzes a certain number of pixel sets as defined hereinafter. One set that the system considers is the CCS described above. The set of other pixels adjacent to the current calcium set CCS is referred to as the adjacent set (AS). The AS pixels form the external boundaries of the current calcium set CCS. The system then analyzes each pixel in the adjacent set (AS). Each analyzed pixel is referred to as the pixel under consideration or (PUC). Another subset that is considered by the system is the set that includes the pixel under consideration PUC and its nearest eight neighbors, referred to as S9. Another subset is the set that only includes the nearest eight neighbors of the pixel under consideration PUC, referred to as S8. Finally the number of pixels in S8 that do not belong to the current calcium set CCS is referred to as No (number of outer pixels), and the number of pixels in S8 that belong to the current calcium set CCS is referred to as Ni (number of inner pixels), such that No+Ni=8.

The region growing method is now explained in further detail. At step 506, the system identifies an adjacent set (AS) of all pixels that are adjacent to the current set of calcium pixels (CCS). The system then considers each pixel in the adjacent set (AS) to decide whether it should be added to the current set of calcium pixels (CCS). At step 508 each pixel in the adjacent set (AS) is retrieved for consideration. Depending on a certain criteria as illustrated in steps 510 through 578, the system determines whether or not the retrieved pixel under consideration (PUC) should be aggregated into the current calcium set (CCS). Once all the pixels in the adjacent set have been considered, the system based on the aggregated pixels defines a new current calcium set (CCS).

As illustrated by step 580, this process is repeated until the final set of current calcium pixels (CCS) is the same as the previous set of the current calcium pixels (CCS). This indicates that no pixel in the adjacent set (AS) can be added to the CCS and that the micro-calcification (MC) cannot grow any further. The system repeats this process for each micro-calcification MC. The resulting final "current calcium sets" (CCS) define contours that closely approximate the actual contours of micro-calcifications in the breast tissue.

Figure 7C:
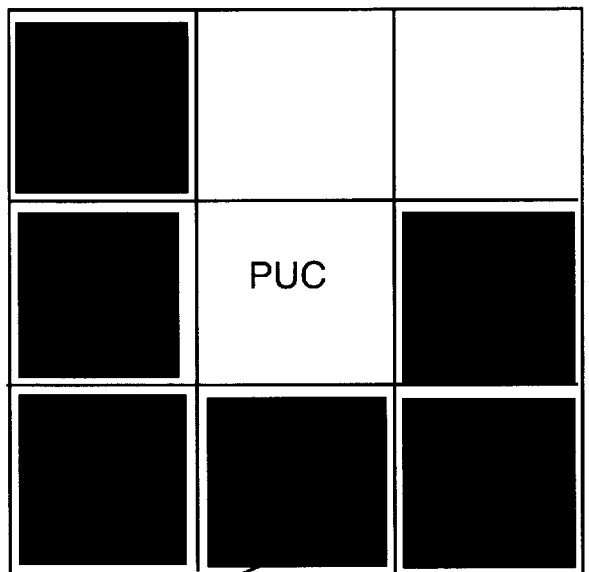
FIGS. 7C and 7D illustrate examples of pixels analyzed in conjunction with the process illustrated in FIGS. 7A and 7B.

In order to determine whether a pixel under consideration PUC should be added to the current calcium set, the system applies four separate rules to each PUC. At step 510, rule 1 is applied. If No<3 (where No is the number of S8 pixels not belonging to the current calcium set CCS), the pixel under consideration is within the "cavern" and is considered as an aberration in the image. The system at step 512 adds the pixel under consideration PUC to the current calcium set CCS without any other consideration. FIG. 7C illustrates a situation where rule 1 is satisfied. Pixels 600 represented as filled dark blocks belong to the current calcium set, and No, the number of pixels that do not belong to the CCS, is equal to 2.

Figure 7D:
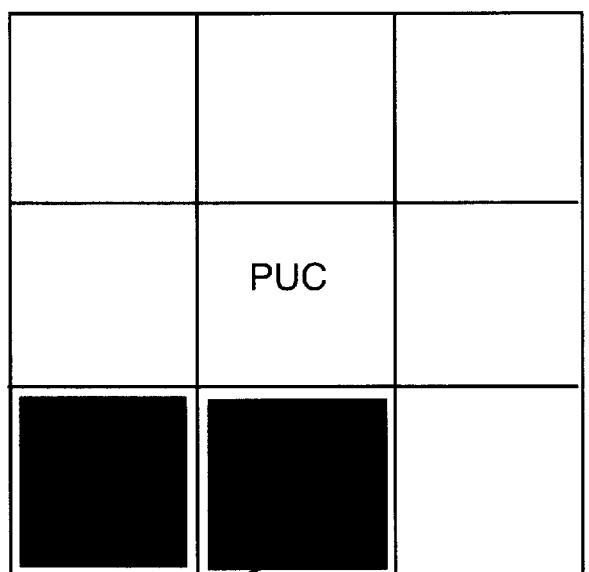

At step 514, the system applies rule 2. If No >5 (where No is the number of S8 pixels not belonging to the current calcium set (CCS)), the pixel under consideration PUC is an asperity and is considered as border noise. The system at step 516 determines that the pixel under consideration PUC is not to be added to the current calcium set (CCS). FIG. 7D illustrates a situation where rule 2 is satisfied. Pixels 600 represented as filled dark blocks belong to the current calcium set, and No, the number of pixels that do not belong to the CCS, is equal to 6.

Rules 1 and 2 described in connection with steps 510 through 516 are based on the morphology of the micro-calcification pixels. If rules 1 and 2 do not apply, the system then goes to step 518 to apply rule 3 which is based on the grey level value of the pixel under consideration GL(PUC). This rule applies if 2<No<6 (where No is the number of S8 pixels not belonging to the current calcium set (CCS)). At step 520 the system determines whether GL(PUC) is less than Tmin. If so, at step 522, the system determines that the pixel under consideration PUC is not to be added to the current calcium set. Tmin is a predetermined threshold, which according to the preferred embodiment of the present invention has two values as follows:

if $GL(h)>15$ then $Tmin=9$ if $GL(h)<16$ then $Tmin=4$ where GL(h) is the grey level value of the brightest pixel in the current calcium set (CCS).

At step 524, the system determines whether the grey level value of the pixel under consideration GL(PUC) is larger than Tmax. If so, at step 526, the system adds the current pixel under consideration PUC to the current calcium set CCS. Tmax is a predetermined threshold, which according to the preferred embodiment of the present invention is 27. If, however, none of the rules 1 through 3 apply, the system goes to step 528 to measure GLi and GLo values. GLi is the average grey level value of the inner pixels Ni (where Ni is the number of S8 pixels that belong to the current calcium set), and GLo is the average grey level value of the outer pixels No (where No is the number of S8 pixels not belonging to the current calcium set CCS).

The system at steps 530 through 578 considers six different possible cases depending on the relationship of the three parameters GLi, GLo and GL(PUC) to one another. The first case begins at step 530 at which point the system determines whether GL(PUC)<GLo<GLi. If so at step 532 the system determines that the current pixel under consideration PUC is not to be added to currens calcium set CCS.

The second case begins at step 534 at which point the system determines whether GL(PUC)<GLi<GLo. If so at step 536, the system goes to process A. At step 554, the system begins the process A by going to step 556 to determine whether $$\frac{GL(PUC)}{GLi} > TR$$

where TR is a threshold ratio constant and represents the value of the ratio of two grey levels below which the two grey levels cannot be considered close to each other. In the preferred embodiment of the present invention TR is 0.8. If at step 556 the system determines that the grey level value of the current pixel under consideration GL(PUC) is not close to GLi (the average grey level value of the inner pixel Ni), then it goes to step 564 where it determines that the current pixel under consideration is not to be added to the current calcium set CCS. Otherwise, GL(PUC) is considered close enough to GLi and the system goes to step 558 to determine whether $GLi>T1$ where T1 is a given threshold value. In the preferred embodiment the value of T1 depends on the grey level value of the brightest pixel in the current calcium set (CCS) as follows:

If $GL(h)>15$ then $T1=11$

If $GL(h)<16$ then $T1=5$

Therefore, if GLi>T1 then the system goes to step 560 to add the current pixel under consideration to the current calcium set. Otherwise the system goes to step 562 and the current pixel under consideration PUC is not added to the current calcium set CCS.

The third case occurs at step 538 when the system determines whether GLi<GLo<GL(PUC). If so, the system at step 540 adds the current pixel under consideration PUC to the current calcium set CCS. Otherwise, the fourth case begins at step 542, where the system determines whether GLi<GL(PUC)<GLo. If so, the system at step 544 adds the current pixel under consideration PUC to the current calcium set CCS. Otherwise, the fifth case begins at step 546, where the system determines whether GLo<GL(PUC)<GLi. If so, the system goes to step 548 to begin the process B. Process B begins at step 566. By going to step 568 the system determines whether:

$$\frac{GL(PUC)}{GLi} > TR$$

where TR is a threshold ratio constant and represents the value of the ratio of two grey levels below which the two grey levels cannot be considered close to each other. In the preferred embodiment of the present invention TR is 0.8. If at step 568 the system determines that the grey level value of the current pixel under consideration GL(PUC) is not close to GLi (the average grey level value of the inner pixel Ni), then it goes to step 576 where it determines that the current pixel under consideration is not to be added to the current calcium set CCS. Otherwise, GL(PUC) is considered close enough to GLi and the system goes to step 570 to determine whether:

GLi>T2 where T2 is a given threshold value. In the preferred embodiment the value of T2 depends on the grey level value of the brightest pixel in the current calcium set (CCS) as follows:

If $GL(h)>15$ then $T2=16$

If $GL(h)<16$ then $T2=8$

Therefore, if GLi>T2 then the system goes to step 572 to add the current pixel under consideration (PUC) to the current calcium set (CCS). Otherwise the system goes to step 574 and the current pixel under consideration PUC is not added to the current calcium set CCS.

Finally, the sixth case occurs at step 550 where the system determines whether GLo<GLi<GL(PUC). If so the system at step 552 adds the current pixel under consideration PUC to the current calcium set CCS. Otherwise, the current pixel under consideration (PUC) is not added to the current calcium set CCS. After considering all the pixels in the adjacent set as described above, the process yields a new current calcium set and a new adjacent set AS. The system goes back to step 508 and repeats he process until no pixel from adjacent set AS can be added to the current calcium set. Once it is determined that the CCS cannot grow any further, the system ends at step 582.

Once the contour of each micro-calcification MC in the region of interest ROI is determined, the system calculates six parameters associated with each micro-calcification MC. Furthermore, the system calculates other parameters associated with a micro-calcification cluster within the region of interest.

The six parameters that characterize each individual micro-calcification are: (1) brightness; (2) area; (3) length; (4) shape factor according to a first alternative referred to as SF1; (5) shape factor according to a second alternative referred to as SF2; and (6) distance to the nearest neighboring micro-calcification MC. For each parameter, the system calculates the average value over all the micro-calcifications MC in the region of interest based on standard arithmetic methods. Further, the system calculates the average value by measuring the mean of the two extreme values in the set. In addition, the system measures the standard deviation of each parameter based on known statistical methods. Finally, the system measures the standard deviation based on the difference between the two extreme values in the set divided by 2.

The first parameter, the brightness of each micro-calcification MC is the average value of grey level values of all pixels in the micro-calcification MC. The second parameter, the area of each micro-calcification MC is the number of pixels in the region, defined in square millimeters.

The third parameter, the length of the micro-calcification MC is the maximum distance between two pixels in the region, expressed in millimeters. The length between two pixels is obtained by the relationship:

$$L = \frac{N * 25.4}{DPI}$$

where L is the length between two pixels in millimeters, N is the number of pixels representing the Euclidian distance between the two pixels and DPI is the scanning resolution in dots per inch.

The fourth parameter, the shape factor (SF1) according to the first alternative is obtained by the relationship:

$$SF1 = \frac{P^2}{S}$$

where P is the perimeter of the micro-calcification MC and S is the area of the MC.

The fifth parameter, the shape factor (SF2) according to the second alternative is obtained by the relationship:

$$SF2 = \frac{R^2 eff}{S}$$

where Reff is the effective radius of the micro-calcification MC and S is the area. In order to obtain the effective radius, first the system derives the coordinates of the pixel which constitutes the center of mass of the micro-calcification MC. The center of mass coordinates Xc and Yc are respectively the average of the x and y coordinates of all the pixels in the micro-calcification MC. The effective radius is calculated by the relationship:

$$Reff = \left[ \frac{1}{N} \sum_{i=1}^{N} |\vec{Ri} - \vec{Rc}|^2 \right]^{1/2}$$

where Ri is the radius vector (Xi, Yi) of each pixel in the micro-calcification and Rc is the radius vector (Xc, Yc) of the center of mass of the micro-calcification and N is the total number of pixels in the micro-calcification.

Finally, the sixth parameter, the distance to the nearest neighboring micro-calcification, is the smallest distance from a given center of mass of a micro-calcification to the center of mass of other micro-calcifications in a cluster.

Table 1 illustrates the parameters describing the micro-calcifications in the region R as described above. The letter "E" in the table denotes the alternative calculation method of the average and the standard deviation as described above. These parameters assist in the diagnosis of micro-calcifications observed on a mammogram. The value of each parameter is compared, either manually or automatically by the system, with statistically derived values to determine whether the observed micro-calcifications are malignant or benign.

TABLE 1

PARAMETERS FOR CHARACTERIZING
MICRO-CALCIFICATION CLUSTERS IN MAMMOGRAMS
These characteristics are individually calculated
for each micro-calcification in the cluster,
and then averaged over the whole cluster.

| | |
|---|---|
| Average Brightness | Average of Shape Factor 1 |
| Deviation of Brightness | Deviation of Shape Factor 1 |
| Average Brightness (E) | Average of Shape Factor 1 (E) |
| Deviation of Brightness (E) | Deviation of Shape Factor 1 (E) |
| Average Area | Average of Shape Factor 2 |
| Deviation of Area | Deviation of Shape Factor 2 |
| Average Area (E) | Average of Shape Factor 2 (E) |
| Deviation of Area (E) | Deviation of Shape Factor 2 (E) |
| Average Length | Average of Distance to the Nearest Neighbor |
| Deviation of Length | Deviation of Distance to the Nearest Neighbor |
| Average Length (E) | Average Distance to the Nearest Neighbor (E) |
| Deviation of Length (E) | Deviation of Distance to the Nearest Neighbor (E) |

The next group of parameters are associated with the structure of a micro-calcification cluster. These parameters are based on adjacent line segments, within the cluster, that connect pairs of micro-calcifications, which according to a predetermined criteria are considered "adjacent" to each other.

The system uses three methods to identify adjacent pair of micro-calcifications in the cluster. All the pairs in the cluster are examined, and the adjacent ones are selected. The system connects all the adjacent micro-calcifications by connecting lines to form a desired set of adjacent line segments. The system measures three parameters corresponding to said line segments, which characterize the structure of micro-calcification clusters. These parameters are: (1) the length of each line segment; (2) the number of neighbors of each micro-calcification region; and (3) the density of the micro-calcification cluster.

The first method for identifying adjacent micro-calcification is based on a triangulation technique known as the Gabriel method. According to this method, the system considers all possible pairs of micro-calcifications in a cluster. For each pair, the system connects a line between the micro-calcification MC's constituting a pair. A circle whose diameter is the same as the connecting line and whose center coincides with the middle of the line is drawn. If the circle does not contain any micro-calcification, then the two micro-calcifications in the cluster are considered adjacent.

The second method for identifying adjacent micro-calcifications is based on another triangulation method known as the Sphere of Influence Graph (SIG). This method utilizes the value of the distance to the nearest neighboring micro-calcification which was defined above as the sixth parameter identifying a micro-calcification. The system draws a circle around each micro-calcification having a radius equal to the distance to the nearest neighboring micro-calcification. Two micro-calcifications are considered adjacent by the SIG method, if the corresponding circles intersect.

The third method for identifying adjacent micro-calcification is based on another triangulation method known as the Digital Delaunay Triangulation method. A process commonly known as "zone of influence" is applied to the cluster to provide a zone of influence for each micro-calcification.

The system labels each micro-calcification in the cluster by a number. All pixels in each micro-calcification receive the same number. Pixels in the image that do not belong to a micro-calcification MC are labelled "0." Thereafter, each pixel in the region of interest is processed according to a certain criteria as described hereinafter.

First, if a pixel has any label except "0," its label remains unchanged.

Second, if a pixel has a label "0" and within its surrounding eight pixels or 3×3 vicinity, there are pixels which have non-zero labels "L", the pixel is also labeled "L."

Third, if a pixel has a label "0" and within its surrounding eight pixels or 3×3 vicinity, there exists two pixels which have different non-zero labels, the pixel remains unchanged. This means that the pixel is located at the boundary of two zones of influence.

The system applies the above three steps to the image repeatedly until no more changes are detected. Two micro-calcifications MC are considered adjacent, if there exists a pixel, which, within its surrounding eight pixels or 3×3 vicinity, there are pixels which have the labels of the two micro-calcifications.

After the system identifies all adjacent micro-calcifications based on the above three methods, it generates a set of line segments that connect the adjacent pairs. The system draws the line segments on a portion of digital image for viewing "adjacent" micro-calcifications on the screen display. Based on the generated set of line segments, the system calculates three parameters as follows: (1) the length of line segment; (2) the number of neighbors of each micro-calcification; and (3) the density of the cluster.

For the first parameter—the length of the line segment—the system calculates the length of the line segments that connect two adjacent micro-calcification regions as identified by each of the three methods described above for identifying adjacent micro-calcifications MC. The system then calculates the average and standard deviation of the length of all line segments in the region of interest. The average value of the line segments is estimated by known arithmetic methods. In addition the average value of the line segments is also estimated based on the mean value of the two extreme values in the set. The standard deviation of the line segments is estimated by known arithmetic methods. In addition the standard deviation of the line segments is also estimated based on the difference between the two extreme values in the set divided by two. Altogether 12 parameters based on the length of the line segments are calculated.

Next the system obtains two parameters associated with the number of neighbors of each micro-calcification in the cluster. The number of neighbors is defined as the number of micro-calcifications that are considered adjacent to a given micro-calcification under each of the three methods described above. The two associated parameters are the average number of neighbors calculated by standard arithmetic methods and standard deviation calculated by known statistical methods. Altogether 6 parameters based on the number of neighbors are calculated.

Finally, the system obtains a value representing the density of the cluster, which is the average number of micro-calcifications MC's per unit area of a cluster. Because the Sphere of Influence Graph (SIG) method described above, is closely related to the visual perception of the interconnections between micro-calcification regions, the parameters calculated by the SIG method are used to calculate the density of a cluster. Thus, the density of a cluster is derived by the relationship:

$$\text{density} = \frac{2(N+1)}{\pi L^2}$$

where N is the average number of neighbors obtained based on SIG method, and L is the average length of line segments obtained based on the SIG method.

Table 2 illustrates a list of the parameters that characterize the structure of micro-calcification clusters derived by the three methods known as: (1) Gabriel; (2) Sphere of Influence Graph and; (3) Delaunay. The letter "E" denotes the alternative calculation methods for finding the average and the standard deviation. These parameters assist in the diagnosis of micro-calcifications observed on a mammogram. The value for each parameter is compared with statistically derived values to determine whether the observed micro-calcifications are malignant or benign.

TABLE 2

These characteristics are calculated for the cluster as a whole, by triangulation methods. Three basic methods are used: Sig, Delaunay and Gabriel

| | |
|---|---|
| Average Distance Between Calcifications (Sig) | Average No. of Neighbors (Delaunay) |
| Deviation of Distance Between Califications (Sig) | Deviation of No. Neighbors (Delaunay) |
| Average of Distance Between Califications (E) | Average No. of Neighbors (Delaunay) (E) |
| Deviation of Distance Between Califications (E) | Deviation of No. Neighbors (Delaunay) (E) |
| Average No. of Neighbors (Sig) | Average Distance Between Califications (Gabriel) |
| Deviation of No. Neighbors (Sig) | Deviation of Distance Between Califications (Gabriel) |
| Average No. of Neighbors (Sig) (E) | Average Distance Between Califications (Gabriel) (E) |
| Deviation of No. of Neighbors (Sig) (E) | Deviation of Distance Between Califications (Gabriel) (E) |
| Average Distance Between Califications (Delaunay) | Deviation of No. of Neighbors (Gabriel) |
| Deviation of Distance Between Califications (Delaunay) | Average of No. of Neighbors (Gabriel) (E) |
| Average Distance Between Califications (Delaunay) (E) | Deviation of No. of Neighbors (Gabriel) (E) |
| Deviation of Distance Between Califications (Deluanay) (E) | Spatial Density of Califications Within the Cluster |

VISUALIZATION AND QUANTIFICATION OF MASS SPICULATION

Figure 8A:
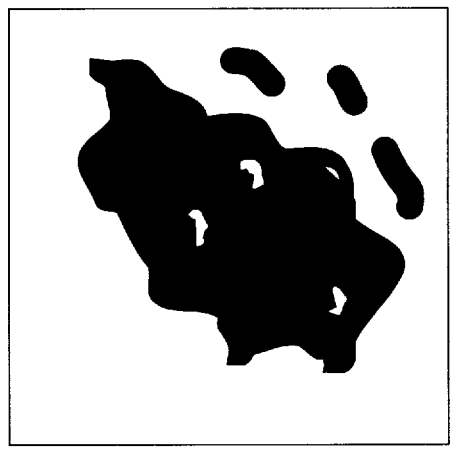
FIG. 8A illustrates a representation of a tumor mass on the digital image.

In addition to micro-calcification, other breast malignancies have the appearance of a stellate lesion having a distinct central tumor mass and a radiating structure with ill defined borders. The radiating structure consists of spicules which are sharp, dense, fine lines of variable length radiating in all directions either within or outside the central tumor mass. The larger the central tumor mass, the longer the spicules. The tumor mass may appear on the original digital image of the mammogram as an ill defined bright spot with border lines spreading out as illustrated in FIG. 8A. The system provides two different tools to visualize the mass and to quantify the degree of its spiculation.

In order to visualize the mass, the system provides a dynamic view of the digital image in color. First, the grey level values are mapped into an RGB space by using a grey level to RGB look-up table. As a result the look-up table yields a different color for each grey level value. The system then applies a moving color enhancement process by gradually changing the brightness of the digital image using the grey scale stretching process described in connection with FIGS. 3A–3D. Each pixel in the digital image acquires a new grey level and therefore a corresponding color based on a conversion curve as illustrated in FIGS. 3A–3D. The color enhancement process begins with a conversion curve with its center disposed to the right of the grey scale. The system gradually moves the center of the conversion curve to the left of the scale. Consequently, the converted images which are displayed on screen display 4 of FIG. 1, first appear in darker colors and as the center of the conversion curve moves to the left of the scale, they appear in brighter colors. The conversion curves have the lowest possible slope to yield images with minimum contrast. The infiltrative effects of the mass can be visualized more clearly because of the dynamic and gradual change of colors in the new images according to the present invention. This allows for a better visual appreciation of mass malignancy.

In order to quantify the degree of spiculation, in a separate process, the system identifies all spiculation pixels of a digital image and, if a mass exists, it calculates certain parameters that represent the degree of spiculation in a tumor mass.

To quantify the degree of spiculation of a mass in the image, the center of the spiculation (CS) is defined by the operator. In an alternative embodiment, the system automatically identifies this center. The system proceeds with calculations based on the spatial distribution of grey levels in the mass and its surrounding regions.

The calculations begin by determining the gradient of grey level for each pixel, more conveniently referred to as the gradient of each pixel. The gradient of a pixel G(P) is a vector whose amplitude is the maximum rate of change of grey level from that pixel to the surrounding pixels in the direction where that maximum rate of change occurs and is defined by the relationship $$G(P) = \frac{dp}{dx} i + \frac{dp}{dy} j$$

where i and j are unit vectors along the x and y axis and p is the grey level of a pixel along the z axis as a function of the pixel's location along the x and y axis.

Thereafter, the rate of change of grey levels of all pixels in the direction of the center of spiculation CS is measured. This is done by calculating the radius vector of each pixel relative to the center of spiculation CS. The vector 1(P) is the unit vector perpendicular to the radius vector along the line connecting the pixel to the center of spiculation CS. The rate of change of the grey levels at each pixel in relation to the center of spiculation can be obtained by the projection of the gradient vector G(P) on the direction of 1(P). This is the scalar product of the gradient of a pixel and the 1(P). Consequently, each pixel is assigned a gradation number based on the scaler product.

Because the structure of spiculation is such that the highest rate of change in grey levels, in relation to the center of spiculation CS, occurs at the borders of the spicules with its surrounding, the pixels which receive high gradation numbers are considered Spiculation Pixels (SP). By identifying the spiculation pixels the system provides a better visualization of the mass.

Figure 8B:
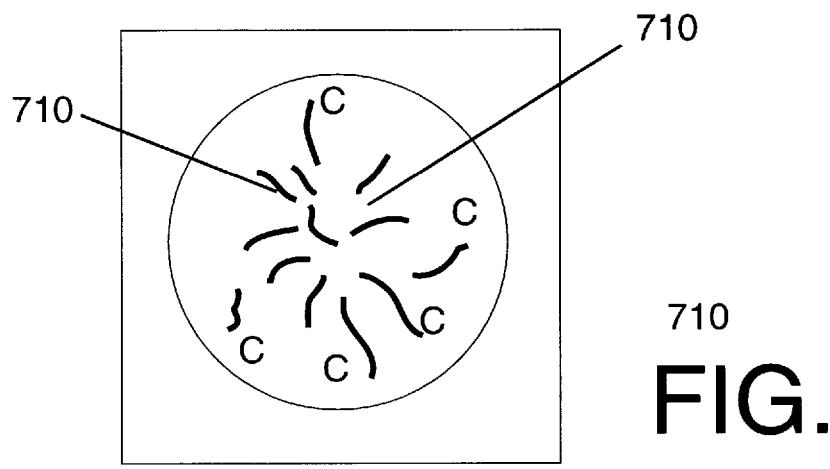
FIG. 8B illustrates spiculations in a Binary Gradient image of the tumor mass of FIG. 8A.
Figure 8C:
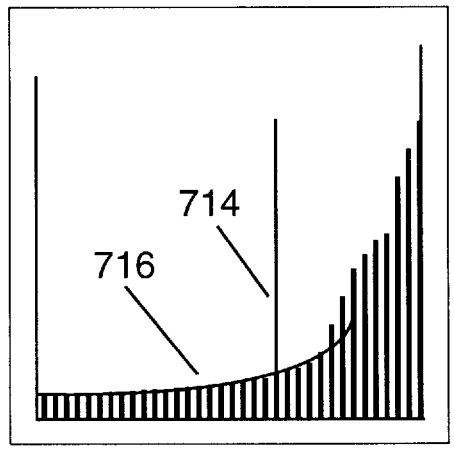
FIG. 8C is a histogram of the Binary Gradient image of FIG. 8B.
Figure 8D:
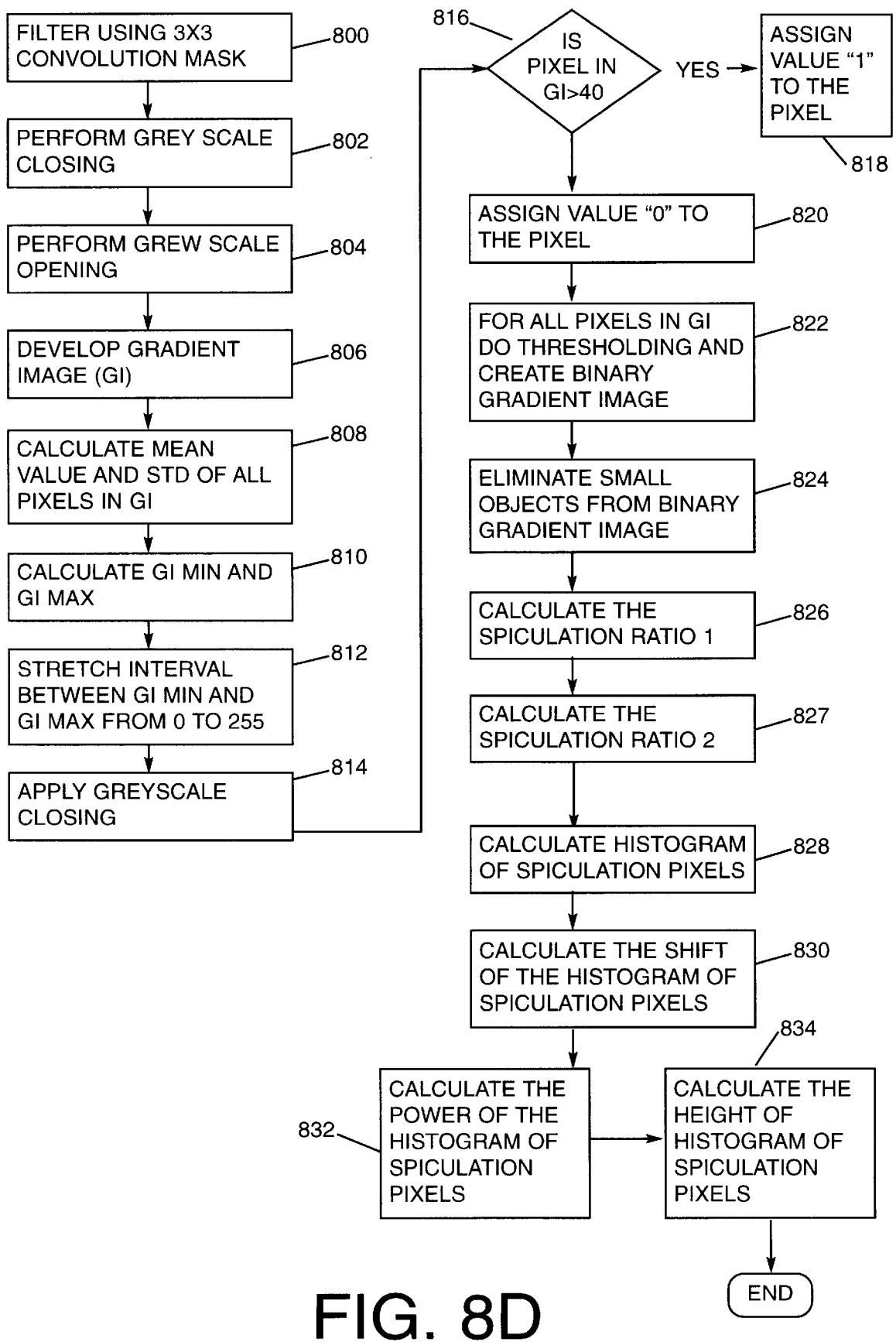
FIG. 8D is a flowchart illustrating detection and quantification of mass spiculations.

The identification of spiculation pixels (SP) is explained more fully hereinafter with reference to FIGS. 8B–8D. At step 800, the system filters the digital image to reduce background noise by using a 3×3 uniform convolution mask.

In the preferred embodiment the system at steps 802 and 804 performs the morphology operations "Grey scale Closing" and "Grey scale opening." Grey scale closing is referred to in the art as the process of successive application of the morphological operations; "dilation" and "erosion." Grey scale opening is the successive application of the morphological operations; "erosion" and "dilation." The structuring element for these operations is a cylinder mask of 0.22 mm-diameter and 14 grey level height. The mask can be viewed as a three dimensional matrix, with the value in each matrix cell being the grey level height. The size of the mask is computed by the relationship:

$$X(\text{pixels}) = \frac{0.22 \text{ mm} \times DPI}{25.4}$$

where X is the size of the mask in pixels, and DPI is the resolution of the scanning process in dots per inch. The 0.22 mm represents the average size of the width of spicules in mammography images.

At step 806 the system develops the Gradient Image (GI) of the original digital image by transforming the grey level value of each pixel into a new grey level value following the relationship $$GI(P) = |G| [Cos (1(P) \char`\^  G(P))]^8$$

where GI(P) is the new grey level value of each pixel in the Gradient Image GI, |G| is the modulus of the gradient of each pixel in the original digital image and [1(P) ^ G(P)] is the radian measure of the angle between the radius vector and the gradient of each pixel in the original digital image. Because all the cosine values are between 0 and 1 and get smaller as the angle reaches 90°, the power 8 lowers the effect of pixels that form a large angle between the radius vector and their gradients. For example:

For Cos(80°)=0.98 and Cos (45°)=0.71 the ratio of Cos (80°)/ Cos (45°) is approximately 1.4.

Whereas:

For Cos (80°)$^8$=0.88 and Cos (45°)$^8$=0.06 the ratio of Cos (80°)$^8$/ Cos (45°)$^8$ is approximately 15.

Because the value range of GI(P) is very narrow, the system is required to stretch the new Gradient Image, while taking into consideration certain parameters of the image. The mean value of GI(P) over the entire image $GI_{mean}$ and the standard deviation $GI_{std}$ are calculated at step 808. The system at step 810 calculates $GI_{min}$ and $GI_{max}$ which are the minimum and maximum grey level values in the gradient image GI and are defined as:

$$GI_{min} = GI_{mean} - 3GI_{std} \quad (0, \text{ if } GI_{mean} - 3GI_{std} < 0)$$

$$GI_{max} = GI_{mean} + 3GI_{std}$$

The system at step 812 stretches the interval [$GI_{min}$, $GI_{max}$] linearly from 0 to 255.

In the preferred embodiment the system at step 814 applies another "Grey scale Closing" in order to join very close bright regions along a spicule. The structuring element for this operation is a cylindrical mask of 0.14 mm diameter and 14 grey level height as explained above.

The system at step 816 performs a thresholding operation by determining whether the grey level of a pixel in the Gradient Image exceeds a given threshold. In the preferred embodiment, this threshold is 40. If so the system at step 818 assigns a value "1" to the corresponding pixel. If not, the system at step 820 assigns a value "0" to the corresponding pixel. At step 822 the thresholding operation yields a Binary Gradient Image (BGI). At step 824 a filtering operation is performed on the Binary Gradient Image (BGI) whereby all objects having diameters less than 0.14 mm are erased from the image. The resulting image is illustrated in FIG. 8B where curves 710 correspond to the spicules of a mass.

Thus, the location of all the pixels that belong to the spiculation pattern only, i.e. the Spiculation Pixels (SP) is identified on the Binary Gradient Image BGI.

The system at step 826 begins to calculate certain parameters that correspond to the degree of the spiculation of a mass. These parameters include: (1) Spiculation Ratio (SR); (2) Shift of Histogram of Spiculation Pixels SP(HSP); (3) Slope of normalized Histogram HSPnorm; and (4) Height of normalized Histogram HSPnorm.

At step 826, the system calculates the Spiculation Ratio which is defined as:

$$SR = \frac{NSP}{NIM}$$

where NSP is the amount of Spiculation Pixels in Binary Gradient Image, for which the value of cos [1(P) ^ G(P)] exceeds a given threshold number, which according to the preferred embodiment, is 0.75, and NIM is the total number of pixels in the image.

At step 828, the system calculates the histogram of Cos [ 1(P) ^ G(P) ] after dividing the values of the Cos [ 1(P) ^ G(P) ] into a given number of intervals. In the preferred embodiment the given number of intervals is 200. This histogram is referred to as the histogram of Spiculation Pixels or SP (HSP). FIG. 8C illustrates the histogram of Spiculation Pixels.

At step 830, the system calculates the shift of the histogram. The shift is defined as the cosine value that separates the histogram SP (HSP) into two parts with equal areas as illustrated by line 714 in FIG. 8C.

At step 832, the system calculates the slope of the histogram. The slope is computed by first obtaining the maximum value of the histogram. The entire histogram is then divided by this maximum value to obtain a normalized histogram HSPnorm. The values of the part of HSPnorm from zero up to the value of Shift are approximated by a straight line 716, defined as Ax+B. The slope of the straight line is defined as the slope of the histogram and is equal to A.

Finally, at step 834, the system calculates the height of the histogram. The height is defined as the value B in the equation of the straight line Ax+B defined above. Altogether four parameters are calculated for the evaluation of the Mammographic Spiculation. These parameters assist in the diagnosis of tumor masses observed on a mammogram. The value of each parameter is compared, either manually or automatically by the system, with statistically derived values to determine whether the observed masses are malignant or benign based on the degree of spiculation.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for diagnosis of living tissue diseases, comprising:
 a computer device for controlling the operation of said system;
 an operator control device coupled to said computer device;
 a viewing screen coupled to said computer device for displaying digitized images of said living tissue, said operator control device selecting desired portions of said digitized image for further image enhancement according to a desired image enhancement feature selectable from a plurality of image enhancement features;
 said plurality of image enhancement features including any combination of grey scale stretching using an S-shaped grey scale conversion curve, contrast enhancement based on logarithmic histogram equalization, and spot enhancement.

2. The system according to claim 1 further comprising means for visualization and quantification of micro-calcifications.

3. The system according to claim 2 further comprising means for visualization and quantification of mass spiculations.

4. The system as claimed in claim 1, further comprising means for displaying the grey level values of at least one pixel on the digital image.

5. The system as claimed in claim 1, further comprising a network terminal for transmitting information to other locations.

6. A method for diagnosis of living tissue diseases, comprising the steps of:
 providing a digital image of said living tissue to a computer;
 displaying said digital image on a viewing screen;
 selecting a portion of said digital image displayed on said viewing screen;
 enhancing the image contained within the selected portion according to one or more options from a plurality of image enhancement features including grey scale stretching using an S-shaped grey scale conversion curve, contrast enhancement based on logarithmic histogram equalization, and spot enhancement.

7. The method according to claim 6 further comprising the steps of visualizing micro-calcifications and quantifying said micro-calcifications.

8. The method according to claim 7 further comprising the steps of visualizing mass spiculations and quantifying said mass spiculations.

9. The method as claimed in claim 8, wherein said enhancement of the displayed image is accomplished in real time.

10. The method as claimed in claim 6, wherein said grey scale stretching further comprises the step of converting original grey levels of the image into new values according to a curve including exponential and logarithmic portions.

11. The method as claimed in claim 10, wherein said conversion curve yields images with adjustable contrast and brightness.

12. The method as claimed in claim 6, wherein said digital image is enhanced by utilizing a logarithmic histogram equalization.

13. The method as claimed in claim 6, wherein said spot enhancement step further comprises the steps of checking the grey level difference between pixels of the image and their surroundings, diminishing the differences above a certain threshold of grey levels and accentuating the differences below a certain threshold.

14. A system for diagnosis of living tissue diseases, comprising:
 a microcomputer for controlling the operation of said system;
 a memory coupled to said microcomputer for storing information as directed by said microcomputer;
 a scanning device coupled to said microcomputer for scanning a mammogram to provide a digital image of said mammogram for storing, viewing and further processing;
 a viewing screen coupled to said microcomputer wherein said digital image of said mammogram is displayed on said viewing screen;
 said microcomputer including circuit means enabling on-line display of selected portions of said scanned mammogram; and
 means for generating a plurality of grey scale conversion curves having a desired center and a desired slope at said center, said conversion curves converting the grey scale of said digital image into a new grey scale of a converted digital image, said desired center being a grey level value corresponding to said digital image such that for all said plurality of grey scale conversion curves said value of desired center is converted into a fixed grey level value on the new converted scale.

15. The system according to claim 14 wherein said grey scale conversion curve includes an exponential curve from grey level value "0" to said desired center and a logarithmic curve from said desired center to grey level value "255."

16. The system according to claim 15 wherein said fixed grey level value on the new converted scale is "127."

17. The system according to claim 16 further comprising means for generating a look up table representing said grey scale conversion curve.

18. The system according to claim 17 further comprising:
 means for selecting a desired grey scale conversion curve for yielding a new digital image which is either darker and brighter than the original digital image; and
 means for selecting a desired slope at said center for yielding a digital image with a variable contrast.

19. The system according to claim 18 further comprising means for generating a color look up table for converting said new digital image into a color image with pixels having different colors according to different combinations of RGB components.

20. The system according to claim 19 further comprising:
 means for generating a plurality of conversion curves with center values ranging from a low grey level value to a high grey level value; and
 means for displaying converted digital images based on said plurality of conversion curves, such that a changing color image appears on said viewing screen.

21. The system according to claim 20 further comprising:
 means for determining an initial grey scale conversion curve including,
  means for generating a histogram of said digital image,
  means for selecting two grey level values g1 and g2 such that a given K percent of pixels in said digital image have original grey level values below g1 and a given N percent of pixels in said digital image have original grey level values above g2,
  means for selecting said center and said slope such that a given (100−(K+N)) percent of new grey level values scale to original grey level values between g1 and g2.

22. A system for diagnosis of living tissue diseases, comprising:
- a microcomputer for controlling the operation of said system;
- a memory coupled to said microcomputer for storing information as directed by said microcomputer;
- a scanning device coupled to said microcomputer for scanning a mammogram to provide a digital image of said mammogram for storing, viewing and further processing;
- a viewing screen coupled to said microcomputer wherein said digital image of said mammogram is displayed on said viewing screen;
- said microcomputer including circuit means enabling on-line display of selected portions of said scanned mammogram; and
- means for generating a plurality of grey scale conversion curves for converting the grey scale of said digital image into a new grey scale said grey scale conversion curves including an exponential curve from grey level value "0" to a desired grey level and a logarithmic curve from said desired grey level to grey level value "255."

23. The system according to claim 22 wherein the slope of said exponential curve and said logarithmic curves are equal at said desired grey level.

24. The system according to claim 23 wherein said slope is variable.

25. The system according to claim 24 further comprising means for generating a look up table representing said grey scale conversion curve.

26. A system for diagnosis of living tissue diseases comprising:
- a microcomputer for controlling the operation of said system;
- a scanning device couple to said microcomputer for scanning a mammogram and providing a digital image of said scanned mammogram;
- means for generating a cumulative logarithmic histogram of said digital image; and
- means for generating a look-up table for converting said digital image with a grey level scale into a new digital image with a new grey level scale such that the cumulative logarithmic histogram of said new digital image is equal to said generated cumulative logarithmic histogram.

27. The system according to claim 26 wherein said means for generating a cumulative logarithmic histogram of said digital image provides a plurality of cumulative logarithmic histogram curves CH(X), following the relationship $$CH(x) = [CH(255) - CH(0)] * \left| \frac{Ln\,(x+1)}{Ln\,(256)} \right|^q + CH(0)$$

where "x" is a grey level value of said digital image between 0 and 255, "q" is a constant parameter for each of said cumulative logarithmic histogram curves, CH(255) is total amount of pixels in the digital image with a grey level value equal to maximum grey level in said digital image and CH(0) is the total amount of pixels in the digital image with a grey level value equal to minimum grey level in said digital image.

28. The system according to claim 27 further comprising means for generating the cumulative histogram of said digital image, wherein said lookup table is an exponential function $$LUT(x) = e^p - 1$$

where LUT(x) is the lookup table transformation function and p is defined as $$p = \left| \frac{ch(x) - ch(0)}{ch(255) - ch(0)} \right|^{1/q} * Ln\,(256)$$

where ch(x) is cumulative histogram of the digital image before transformation and ch(255) is the total number of pixels in the region of interest and ch(0) is the number of pixels with a grey level value equal to minimum grey level value in said digital image.

29. The system according to claim 28 further comprising means for varying said factor "q" for generating a plurality of said lookup tables.

30. The system according to claim 29 further comprising a pointing device coupled to said microcomputer wherein sliding movement of said pointing device back and forth along one direction causes the change in said constant "q".

31. The system according to claim 30 wherein said movement of said pointing device along an x axis changes a grey level value mx from 0 to 255 and said constant q is calculated by relationship $$q = \frac{Ln\left(1 - \frac{mx}{255}\right)}{Ln\frac{Ln\,(mx+1)}{Ln\,(256)}}$$

32. A system for diagnosis of living tissue diseases comprising:
- a microcomputer for controlling the operation of said system;
- a scanning device coupled to said microcomputer for scanning a mammogram and providing a digital image of said scanned mammogram;
- means for comparing grey level values between pixels of the image and their surroundings; and
- means for generating a new digital image wherein differences above a certain threshold of grey levels are diminished and differences below a certain threshold of grey levels are accentuated.

33. The system according to claim 32 wherein said means for comparing the grey level values between pixels of the image and their surroundings further comprises:
- means for generating a contrast table having a plurality of pairs of grey level values the first element of each pair being grey level value of each pixel in the digital image and the second element of each pair being the average value of grey levels of a desired number of pixels surrounding said pixel in the digital image;
- means for comparing said plurality of pairs of grey level values; and
- means for reducing said plurality of pairs when elements in one pair overlap with elements in another pair until none of the remaining pairs overlap.

34. The system according to claim 33 wherein said means for generating a new digital image further comprises:
- means for generating a lookup table having a plurality of incrementing steps, the input of which is the grey level values of said digital image, each step representing an interval defined by each pair among said remaining pairs, said lookup table converting the grey level values within each interval into new grey level values which are linearly distributed within a fixed increment along the new grey scale.

35. A system for diagnosis of living tissue diseases, comprising:

a microcomputer for controlling the operation of said system;

a memory coupled to said microcomputer for storing information as directed by said microcomputer;

a scanning device coupled to said microcomputer for scanning a mammogram to provide a digital image of said mammogram for storing, viewing and further processing;

a viewing screen coupled to said microcomputer wherein said digital image of said mammogram is displayed on said viewing screen;

said microcomputer including circuit means enabling on-line display of selected portions of said scanned mammogram;

means for user definition of micro-calcifications by interactively trimming a grey level threshold such that all pixels above said grey level threshold are highlighted as micro-calcifications; and a region growing means for estimating the contour of said micro-calcifications, said region growing means comprising means for selecting and defining a current set of calcium pixels for each said micro-calcification.

36. The system according to claim 35 further comprising:

a background suppression means for suppressing the background image; and means for producing an image with micro-calcifications having estimated contours which closely approximate the actual contour of said micro-calcifications.

37. The system according to claim 36 further comprising means for estimating a plurality of parameters of each micro-calcification corresponding to brightness, area, length, shape factor and distance to the nearest micro-calcification.

38. The system according to claim 37 further comprising means for identifying all pairs of micro-calcifications within a cluster that are considered to be adjacent using a triangulation technique.

39. The system according to claim 38 further comprising means for generating a plurality of line segments connecting said pairs of adjacent micro-calcifications.

40. The system according to claim 39 further comprising means for calculating a plurality of parameters based on said line segments including the length of each line segment, the number of neighbors of each micro-calcification and the density of a micro-calcification cluster.

41. A system for diagnosis of living tissue diseases, comprising:

a microcomputer for controlling the operation of said system;

a memory coupled to said microcomputer for storing information as directed by said microcomputer;

a scanning device coupled to said microcomputer for scanning a mammogram to provide a digital image of said mammogram for storing, viewing and further processing;

a viewing screen coupled to said microcomputer wherein said digital image of said mammogram is displayed on said viewing screen;

said microcomputer including circuit means enabling on-line display of selected portions of said scanned mammogram; and means for measuring the degree of spiculation of a mass including, means for generating a binary gradient image of said digital image said binary gradient image having identified spiculation pixels, and means for measuring spiculation ratio based on said binary gradient image.

42. The system according to claim 41 further comprising means for generating histogram of spiculation pixels.

43. The system according to claim 42 further comprising means for calculating the shift of said histogram of spiculation pixels.

44. The system according to claim 43 further comprising means for calculating the slope of said histogram of spiculation pixels.

45. The system according to claim 44 further comprising means for calculating the height of said histogram of spiculation pixels.

46. In a computer based system, a method for diagnosis of living tissue diseases, comprising the steps of:

scanning a mammogram to provide a digital image of said mammogram for storing, viewing and further processing;

displaying said digital image of said mammogram on a viewing screen;

selecting a desired portion of said digital image; and generating a plurality of grey scale conversion curves having a desired center and a desired slope at said center, each one of said conversion curves converting the grey scale of said digital image into a new grey scale of a converted digital image, said desired center being a grey level value corresponding to said digital image such that for all said plurality of grey scale conversion curves said value of desired center is converted into a fixed grey level value on the new converted scale.

47. The method according to claim 46 wherein said grey scale conversion curve includes an exponential curve from grey level value "0" to said desired center and a logarithmic curve from said desired center to grey level value "255".

48. The method according to claim 47 further comprising the steps of:

selecting a desired grey scale conversion curve for yielding a new digital image which is either darker and brighter than the original digital image; and selecting a desired slope at said center for yielding a digital image with a variable contrast.

49. The method according to claim 48 further comprising the step of generating a color look up table for converting said new digital image into a color image with pixels having different colors according to different combinations of RGB components.

50. The method according to claim 49 further comprising the steps of generating a plurality of images resulting from a plurality of conversion curves with center values ranging from a low grey level value to a high grey level value;

displaying said plurality of images at a given rate creating an appearance of a moving image with changing colors.

51. In a computer based system, a method for diagnosis of living tissue diseases comprising the steps of:

scanning a mammogram and providing a digital image of said scanned mammogram to said computer;

generating a cumulative logarithmic histogram of said digital image; and generating a look-up table for converting said digital image with a grey level scale into a new digital image with a new grey level scale such that the cumulative logarithmic histogram of said new digital image closely approximates said generated cumulative logarithmic histogram.

52. The method according to claim 51 wherein said step of generating a cumulative logarithmic histogram of said digital image provides a plurality of cumulative logarithmic histogram curves CH(X), following the relationship $$CH(x) = [CH(255) - CH(0)] * \left| \frac{Ln(x+1)}{Ln(256)} \right|^q + CH(0)$$

where "x" is a grey level value of said digital image between 0 and 255, "q" is a constant parameter for each of said cumulative logarithmic histogram curves, CH(255) is total amount of pixels in the digital image with a grey level value equal to maximum grey level in said digital image and CH(0) is the total amount of pixels in the digital image with a grey level value equal to minimum grey level in said digital image.

53. The method according to claim 52 further comprising the step of generating the cumulative histogram of said digital image, wherein said lookup table is an exponential function $$LUT(x) = e^p - 1$$

where LUT(x) is the lookup table transformation function and p is defined as $$p = \left| \frac{ch(x) - ch(0)}{ch(255) - ch(0)} \right|^{1/q} * Ln(256)$$

where ch(x) is cumulative histogram of the digital image before transformation and ch(255) is the total number of pixels in the region of interest and ch(0) is the number of pixels with a grey level value equal to minimum grey level value in said digital image.

54. The method according to claim 53 further comprising the step of varying said factor "q" for generating a plurality of said lookup tables.

55. In a computer based system, a method for diagnosis of living tissue diseases comprising the steps of:
scanning a mammogram and providing a digital image of said scanned mammogram;
comparing grey level values between pixels of the image and their surroundings; and
generating a new digital image wherein differences above a certain threshold of grey levels are diminished and differences below a certain threshold are accentuated.

56. The method according to claim 55 wherein said step for comparing the grey level values between pixels of the image and their surroundings further comprises:
generating a contrast table having a plurality of pairs of grey level values the first element of each pair being grey level value of each pixel in the digital image and the second element of each pair being the average value of grey levels of a desired number of pixels surrounding said pixel in the digital image;
comparing said plurality of pairs of grey level values;
reducing said plurality of pairs when elements in one pair overlap with elements in another pair until none of the remaining pairs overlap;
generating a lookup table having a plurality of incrementing steps, the input of which is the grey level values of said digital image, each step representing an interval defined by each pair among said remaining pairs, said lookup table converting the grey level values within each interval into new grey level values which are linearly distributed within a fixed increment along the new grey scale.

57. In a computer based system a method for diagnosis of living tissue diseases, comprising the steps of:
scanning a mammogram to provide a digital image of said mammogram for storing, viewing and further processing;
displaying said digital image on a viewing screen;
selecting a desired portion of said scanned mammogram;
displaying micro-calcifications which are user-defined by interactively trimming a grey level threshold such that all pixels above said grey level threshold are highlighted as micro-calcifications;
estimating the contour of said micro-calcifications using a region growing process, said region growing process comprising selecting and defining a current set of calcium pixels for each said micro-calcification; and
producing an image with micro-calcifications which closely approximates the actual contour of said micro-calcifications.

58. The method according to claim 57 further comprising the steps of:
suppressing the background image prior to said step of interactive trimming;
estimating a plurality of parameters of each micro-calcification region corresponding to brightness, area, length, shape factor and distance to the nearest micro-calcification region after said step of producing an image with micro-calcifications.

59. A method according to claim 58 further comprising the steps of:
identifying all pairs of micro-calcifications within a cluster that are considered to be adjacent using a triangulation technique;
generating a plurality of line segments connecting said pairs of adjacent micro-calcifications; and
calculating a plurality of parameters based on said line segments including the length of each line segment, the number of neighbors of each micro-calcification and the density of a micro-calcification cluster.

60. In a computer based system, a method for diagnosis of living tissue diseases, comprising the steps of:
scanning a mammogram to provide a digital image of said mammogram for storing, viewing and further processing;
displaying said digital image on a viewing screen;
selecting a desired portion of said digital image; and
measuring the degree of spiculation of a mass by, generating a binary gradient image of said digital image said binary gradient image having identified spiculation pixels.

61. The method according to claim 60 further comprising the steps of:
measuring spiculation ratio based on said binary gradient image;
generating histogram of spiculation pixels;
calculating the shift, the slope and the height of said histogram of spiculation pixels.

* * * * *